(12) United States Patent
Kawamura et al.

(10) Patent No.: US 10,250,759 B2
(45) Date of Patent: Apr. 2, 2019

(54) COMMUNICATION TERMINAL DEVICE, OUTGOING CALL CONTROL METHOD, AND PROGRAM

(71) Applicant: NTT DOCOMO, INC., Tokyo (JP)

(72) Inventors: Satoru Kawamura, Tokyo (JP); Nobuto Arai, Tokyo (JP); Tsuneyo Yamauchi, Tokyo (JP); Shunsaku Yamazaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/542,632

(22) PCT Filed: Jan. 18, 2016

(86) PCT No.: PCT/JP2016/051259
§ 371 (c)(1),
(2) Date: Jul. 10, 2017

(87) PCT Pub. No.: WO2016/114403
PCT Pub. Date: Jul. 21, 2016

(65) Prior Publication Data
US 2018/0124255 A1    May 3, 2018

(30) Foreign Application Priority Data
Jan. 16, 2015    (JP) .................................. 2015-007089

(51) Int. Cl.
*H04M 1/26* (2006.01)
*H04M 1/725* (2006.01)
(Continued)

(52) U.S. Cl.
CPC .............. *H04M 19/04* (2013.01); *G06F 3/01* (2013.01); *G06F 3/017* (2013.01); *G06F 3/0346* (2013.01);
(Continued)

(58) Field of Classification Search
CPC ............... H04M 2250/12; H04M 1/27; H04M 1/72519; H04M 1/72569; G06F 3/017
(Continued)

(56) References Cited

U.S. PATENT DOCUMENTS

2009/0137278 A1    5/2009  Haru et al.
2011/0306304 A1*  12/2011  Forutanpour ....... G06F 3/04883
                                                                  455/67.11
(Continued)

FOREIGN PATENT DOCUMENTS

JP          05103067 A       4/1993
JP        2000261573 A       9/2000
(Continued)

OTHER PUBLICATIONS

International Search Report for Corresponding PCT Application No. PCT/JP2016/051259, dated Apr. 5, 2016.
(Continued)

*Primary Examiner* — Simon Nguyen
(74) *Attorney, Agent, or Firm* — MKG, LLC

(57) ABSTRACT

A communication terminal device is a mobile communication terminal device that carries out communication for voice calls. The communication terminal device measures an orientation and a displacement of the device itself, and determines whether or not a condition occurring when a user picks up the device in his/her hand is met. In the case where it is determined that the condition occurring when the user picks up the device in his/her hand is met, and in the case where it has been determined that the user's head area has been detected as being near, the communication terminal device specifies a voice call partner on the basis of the orientation measured before the head area was detected as being near or while the head area was detected as being near. Then, when a tap operation performed by the user is
(Continued)

detected, the communication terminal device performs a notification processing for making a notification of the specified voice call partner, and then makes an outgoing call to the partner.

12 Claims, 14 Drawing Sheets

(51) Int. Cl.
- *G06F 3/0346* (2013.01)
- *H04M 19/04* (2006.01)
- *G06F 3/01* (2006.01)

(52) U.S. Cl.
CPC ......... *H04M 1/26* (2013.01); *H04M 1/72519* (2013.01); *H04M 1/72569* (2013.01); *H04M 2250/12* (2013.01)

(58) Field of Classification Search
USPC .................................................. 455/460, 564
See application file for complete search history.

(56) References Cited

U.S. PATENT DOCUMENTS

| | | | | |
|---|---|---|---|---|
| 2012/0244911 A1* | 9/2012 | Endo | ................. | H04M 1/72552 455/566 |
| 2013/0310110 A1 | 11/2013 | Forutanpour et al. | | |
| 2014/0357251 A1* | 12/2014 | Forutanpour | ....... | H04M 1/6008 455/418 |
| 2015/0201056 A1 | 7/2015 | Kamii et al. | | |
| 2015/0205379 A1* | 7/2015 | Mag | ...................... | G06F 1/1626 345/156 |
| 2016/0085327 A1* | 3/2016 | Lee | ..................... | H04M 1/0214 345/173 |
| 2016/0253064 A1* | 9/2016 | Hattori | ................ | H04M 1/0281 715/716 |
| 2017/0353797 A1* | 12/2017 | Hosoi | ................... | H04R 5/033 |

FOREIGN PATENT DOCUMENTS

| | | |
|---|---|---|
| JP | 2002027081 A | 1/2002 |
| JP | 2002330210 A | 1/2002 |
| JP | 2007066180 A | 3/2007 |
| JP | 2010056878 A | 3/2010 |
| JP | 2011211759 A | 10/2011 |
| JP | 2011221863 A | 11/2011 |
| JP | 2014068246 A | 4/2014 |
| WO | 2014208665 A1 | 12/2014 |

OTHER PUBLICATIONS

Office Action issued in corresponding Japanese Patent Application No. 2016-569534, dated May 8, 2018, 5 pages.

Extended European Search Report issued in corresponding European Application No. 16737474.3 dated Aug. 1, 2018, 8 pages.

* cited by examiner

| CALL DESTINATION INFORMATION | PARTNER SPECIFYING CONDITIONS |
|---|---|
| PARTNER A | ORIENTATION/DISPLACEMENT PATTERN PA (RIGHT EAR) + FORWARD-TILTING ORIENTATION |
| PARTNER B | ORIENTATION/DISPLACEMENT PATTERN PB (LEFT EAR) + FORWARD-TILTING ORIENTATION |
| PARTNER C | ORIENTATION/DISPLACEMENT PATTERN PA (RIGHT EAR) + REARWARD-TILTING ORIENTATION |
| PARTNER D | ORIENTATION/DISPLACEMENT PATTERN PB (LEFT EAR) + REARWARD-TILTING ORIENTATION |

FIG. 8

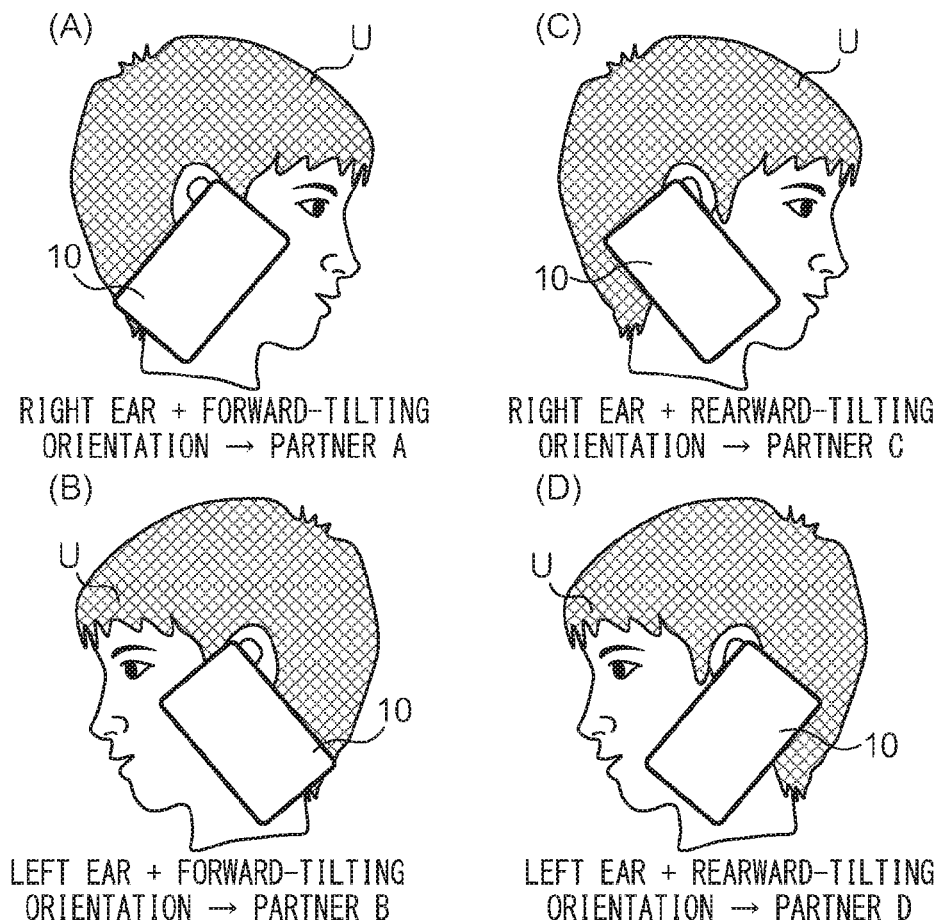

FIG. 9

| CALL DESTINATION INFORMATION | PARTNER SPECIFYING CONDITIONS | 191 |
|---|---|---|
| PARTNER A | ORIENTATION/DISPLACEMENT PATTERN PA (RIGHT EAR) + ONE TAP OPERATION | |
| PARTNER B | ORIENTATION/DISPLACEMENT PATTERN PB (LEFT EAR) + ONE TAP OPERATION | |
| PARTNER C | ORIENTATION/DISPLACEMENT PATTERN PA (RIGHT EAR) + TWO TAP OPERATIONS | |
| PARTNER D | ORIENTATION/DISPLACEMENT PATTERN PB (LEFT EAR) + TWO TAP OPERATIONS | |

FIG. 10

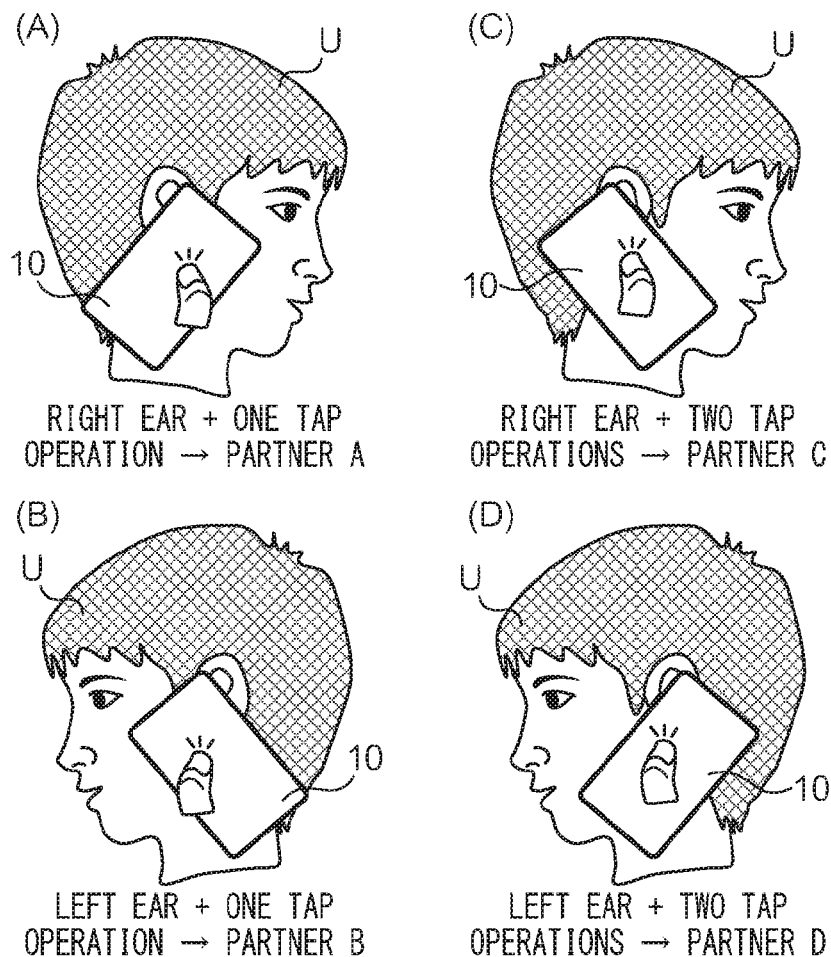

FIG. 11

| TIME-BASED CONDITIONS | CALL DESTINATION INFORMATION | PARTNER SPECIFYING CONDITIONS |
|---|---|---|
| MON-FRI | PARTNER A | ORIENTATION/DISPLACEMENT PATTERN PA (RIGHT EAR) |
| SAT AND HOLIDAYS | PARTNER C | |
| MON-FRI | PARTNER B | ORIENTATION/DISPLACEMENT PATTERN PB (LEFT EAR) |
| SAT AND HOLIDAYS | PARTNER D | |

| LOCATION-BASED CONDITIONS | CALL DESTINATION INFORMATION | PARTNER SPECIFYING CONDITIONS |
|---|---|---|
| WORKPLACE | PARTNER A | ORIENTATION/DISPLACEMENT PATTERN PA (RIGHT EAR) |
| NON-WORKPLACE | PARTNER C | |
| WORKPLACE | PARTNER B | ORIENTATION/DISPLACEMENT PATTERN PB (LEFT EAR) |
| NON-WORKPLACE | PARTNER D | |

| DATE/TIME | PEOPLE | ... |
|---|---|---|
| 2015/09/04 (FRI) 10:00-17:00 | PARTNER A, PARTNER D | ... |

192

| DATE/TIME | PLACE | ... |
|---|---|---|
| 2015/09/05 (SAT) 10:00-15:00 | WORKPLACE | ... |

COMMUNICATION TERMINAL DEVICE, OUTGOING CALL CONTROL METHOD, AND PROGRAM

TECHNICAL FIELD

The present invention relates to control carried out when making an outgoing voice call.

BACKGROUND ART

JP2002-330210A discloses a technique in which a cellular phone decides on and calls a voice call partner without a user operating an operating unit. According to the technique disclosed in JP2002-330210A, the number of times the cellular phone has been shaken by the user at no less than a given strength or acceleration is counted and a telephone number (speed dial number) corresponding to that number of times is called. Although not a technique pertaining to voice calls, JP2007-66180A discloses rendering a graphic corresponding to a movement trajectory of a cellular phone device on a screen of the device, on the basis of translational acceleration acting on the cellular phone device and an orientation angle that is an angle of rotation from a reference orientation.

SUMMARY

The operation of shaking the cellular phone according to the technique disclosed in JP2002-330210A is not a typical operation made during a voice call by a person attempting to have a voice call. It is thus necessary for a user of the cellular phone to carry out an operation different from a typical operation made during a voice call each time s/he will make a voice call.

In light of this, it is an object of the present invention to specify a voice call partner through an operation typically carried out by a user when making a voice call, without the user operating an operating unit.

To solve the above-described problems, a communication terminal device according to the present invention is a mobile communication terminal device including: a specifying unit that specifies a voice call partner; an outgoing call control unit that calls the specified partner; a measurement unit that measures an orientation or a displacement of the communication terminal device; and a proximity detection unit that detects when a head area of a user is near the communication terminal device. In the case where the head area is detected as being near, the specifying unit specifies the partner on the basis of the orientation or displacement measured before the head area was detected as being near or while the head area was detected as being near.

In the communication terminal device according to the present invention, the specifying unit may specify the partner on the basis of a change over time in the measured orientation.

In the communication terminal device according to the present invention, the specifying unit may specify the partner on the basis of the orientation measured at a single point in time while the head area is detected as being near.

The communication terminal device according to the present invention may further include an operation detection unit that detects a predetermined operation being made by the user using the communication terminal device, and the outgoing call control unit may make an outgoing call to the specified partner in the case where the operation is detected.

In this communication terminal device, wherein the specifying unit may specify the partner on the basis of the measured orientation or displacement and the operation detected while the head area is detected as being near.

In the present invention, the communication terminal device may further include: an operation detection unit that detects a predetermined operation being made by the user using the communication terminal device; and a display control unit that, in the case where a predetermined operation made using the communication terminal device is detected, causes a partner screen indicating the partner to be specified by the specifying unit to be displayed in a display unit. In the case where the head area is detected as being near during a display period of the partner screen, the outgoing call control unit makes an outgoing call to a call destination specified on the basis of an orientation or displacement measured during the display period.

The communication terminal device according to the present invention may further include a notification processing unit that makes a notification of the specified partner by outputting audio.

In the communication terminal device according to the present invention, in the case where the orientation or displacement meeting a predetermined condition are measured after an outgoing call to the specified partner has been initiated, the outgoing call control unit may terminate the outgoing call.

In the communication terminal device according to the present invention, the outgoing call control unit may not permit an outgoing call to be made to the partner in a period when the communication terminal device in which the outgoing call control unit is included is outputting audio.

In the communication terminal device according to the present invention, the specifying unit may vary the partner specified in the case where a predetermined orientation or displacement has been measured, in accordance with a point in time when the measurement was made, a location where the measurement was made, or schedule data of the user.

A communication terminal device according to the present invention is a communication terminal device having a receiver, the device including: a specifying unit that specifies a voice call partner; an outgoing call control unit that calls the specified partner; a measurement unit that measures an orientation or a displacement of the receiver; and a proximity detection unit that detects when a head area of a user is near the receiver. In the case where the head area is detected as being near, the specifying unit specifies the partner on the basis of the orientation or displacement measured before the head area was detected as being near or while the head area was detected as being near.

An outgoing call control method according to the present invention is an outgoing call control method for a mobile communication terminal device, the method including: a step of specifying a voice call partner; a step of measuring an orientation or a displacement of the communication terminal device; and a step of detecting when a head area of a user is near the communication terminal device. In the case where the head area is detected as being near, in the step of specifying, the partner is specified on the basis of the orientation or displacement measured before the head area was detected as being near or while the head area was detected as being near.

A program according to the present invention is a program for causing a computer of a mobile communication terminal device to execute: a step of specifying a voice call partner; a step of measuring an orientation or a displacement of the communication terminal device; and a step of detecting when a head area of a user is near the communication terminal device. In the case where the head area is detected as being near, in the step of specifying, the partner is specified on the basis of the orientation or displacement measured before the head area was detected as being near or while the head area was detected as being near.

According to the present invention, a voice call partner can be specified through an operation typically carried out by a user when making a voice call, without the user operating an operating unit.

BRIEF DESCRIPTION OF DRAWINGS

FIG. 8 is a diagram illustrating the configuration of a call destination table according to a second embodiment of the present invention.

FIG. 9 is a descriptive diagram illustrating orientations measured while a user's head area is detected as being near.

FIG. 10 is a diagram illustrating the configuration of a call destination table according to a third embodiment of the present invention.

FIG. 11 is a descriptive diagram illustrating operations carried out by a user while the user's head area is detected as being near.

FIG. 16 is a diagram illustrating the configuration of a call destination table according to a sixth embodiment (Configuration Example 1) of the present invention.

FIG. 17 is a diagram illustrating the configuration of a call destination table according to the same embodiment (Configuration Example 2).

FIG. 18 is a diagram illustrating the configuration of schedule data according to the same embodiment (Configuration Example 3).

DETAIL DESCRIPTION

Embodiments of the present invention will now be described with reference to the drawings.

First Embodiment

Figure 1:
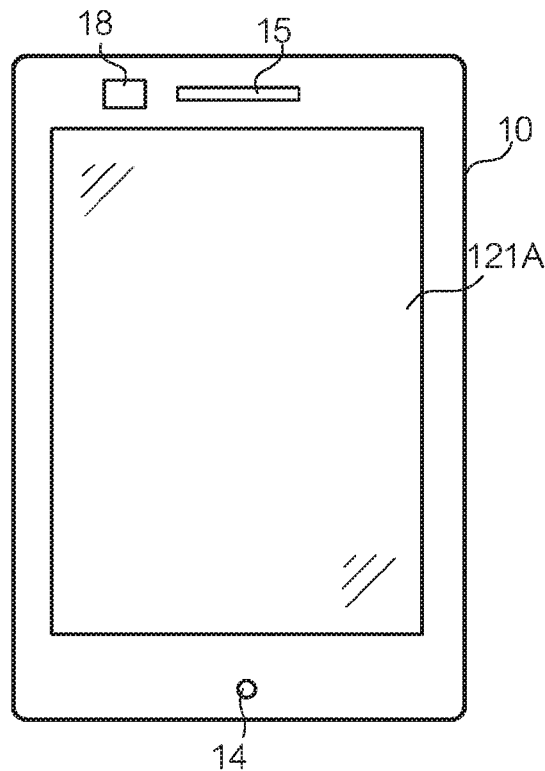
FIG. 1 is a front view of a communication terminal device according to a first embodiment of the present invention.

FIG. 1 is a front view of communication terminal device 10 according to a first embodiment of the present invention. Communication terminal device 10 is a mobile communication terminal device used while a user holds the device in his/her hand. In the present embodiment, communication terminal device 10 is a smartphone. Communication terminal device 10 has the same external appearance as a generic smartphone, and is formed in a substantially parallelepiped shape.

Communication terminal device 10 sends and receives voice for the purpose of voice calls. Communication terminal device 10 includes microphone 14 and speaker 15 on a front surface side thereof. Microphone 14 is a device for inputting voice to be sent. Microphone 14 is disposed in a location near the mouth of the user making a voice call. Speaker 15 is a device for outputting voice that is received. Speaker 15 is disposed in a location near the head area (and more specifically, an ear) of the user making a voice call.

Communication terminal device 10 further includes display region 121A and proximity sensor 18 on the front surface side thereof. Display region 121A is a region in which an image (a screen) of display unit 121, which will be described later, is displayed. Proximity sensor 18 is provided adjacent to speaker 15, and is a sensor for detecting when the user's head area is near.

Figure 2:
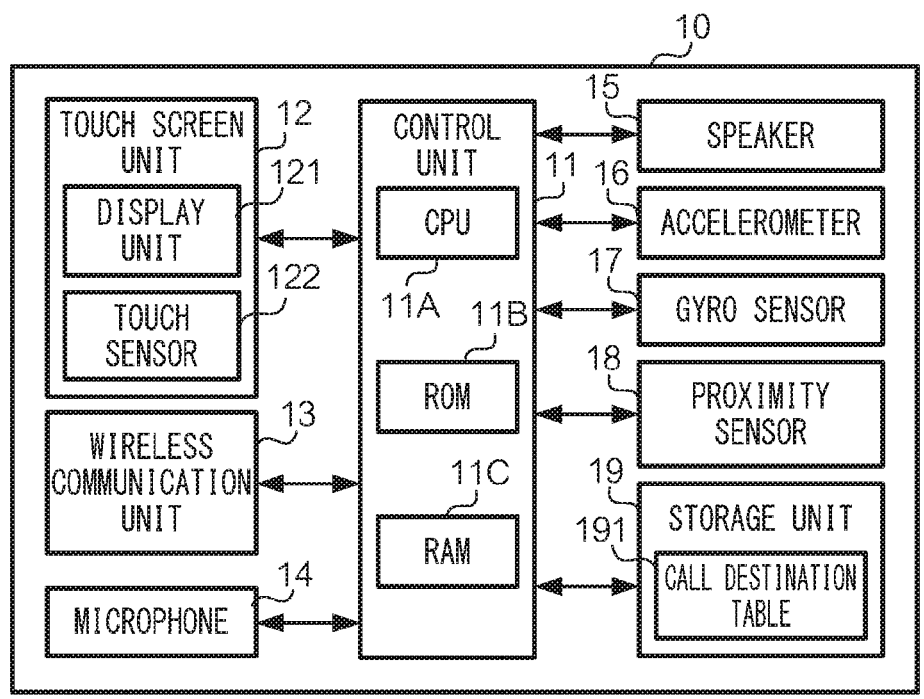
FIG. 2 is a block diagram illustrating the hardware configuration of the communication terminal device according to the same embodiment.

FIG. 2 is a block diagram illustrating the hardware configuration of communication terminal device 10. As illustrated in FIG. 2, communication terminal device 10 includes control unit 11, touch screen unit 12, wireless communication unit 13, microphone 14, speaker 15, accelerometer 16, gyrosensor 17, proximity sensor 18, and storage unit 19.

Control unit 11 is a processor including Central Processing Unit (CPU) 11A, which serves as a computation processing device, Read-Only Memory (ROM) 11B, and Random Access Memory (RAM) 11C, which serves as a work area. CPU 11A controls the various elements of communication terminal device 10 by reading out programs stored in ROM 11B or storage unit 19 into RAM 11C and executing those programs. Control unit 11 carries out various types of control for voice calls, for example.

Touch screen unit 12 includes display unit 121 and touch sensor 122. Display unit 121 is a liquid crystal display, for example, and displays images in display region 121A (see FIG. 1). Touch sensor 122 is a sensor provided in a planar shape overlapping display region 121A, and detects a user operation made on display region 121A in accordance with a predetermined system (for example, a resistive film system or an electrostatic capacitance system).

Wireless communication unit 13 has a wireless communication circuit and an antenna, and carries out wireless communication. Wireless communication unit 13 is a communication that is connected to a telephone line, which is not illustrated, and at least carries out communication for voice calls. Wireless communication unit 13 receives incoming voice calls and makes outgoing calls to partners of voice calls, for example.

Microphone 14 converts voice inputted by the user into a voice signal. Speaker 15 converts a supplied voice signal into voice and outputs the resulting voice.

Accelerometer 16 is a three-axis accelerometer, for example, and is a sensor that measures an acceleration acting on communication terminal device 10. Accelerometer 16 is used to measure an orientation or a displacement (movement) of communication terminal device 10. Gyrosensor (angular velocity sensor) 17 is a three-axis angular velocity sensor, for example, and is a sensor that measures an angular velocity acting on communication terminal device 10. Gyrosensor 17 is used to measure the orientation of communication terminal device 10.

The orientation of communication terminal device 10 at various points in time is specified on the basis of a tilt (rotation angle) from a reference direction of communication terminal device 10. The displacement of communication terminal device 10 is specified on the basis of, for example, a trajectory along which communication terminal device 10 moves. This trajectory is specified on the basis of, for example, a combination of a distance communication terminal device 10 has moved and a direction of that movement.

Proximity sensor 18 is a sensor for detecting when the user's head area is near. Proximity sensor 18 is an induction-type or electrostatic capacitance-type proximity sensor, for example, and detects when an object has come within a predetermined distance. Proximity sensor 18 can detect when an object is near on the basis of whether the object is in a state of no contact or a state of contact.

Storage unit 19 has an Electronically Erasable and Programmable ROM (EEPROM) or a flash memory, for example, and stores various types of data. Storage unit 19 stores various types of programs such as an Operating System (OS) installed in communication terminal device 10 and programs that run on the OS. Storage unit 19 also stores call destination table 191 used in control pertaining to an automatic outgoing call function. The automatic outgoing call function is a function for specifying and calling a voice call partner without the user operating an operating unit in order to specify the voice call partner.

Figures 3, 4:
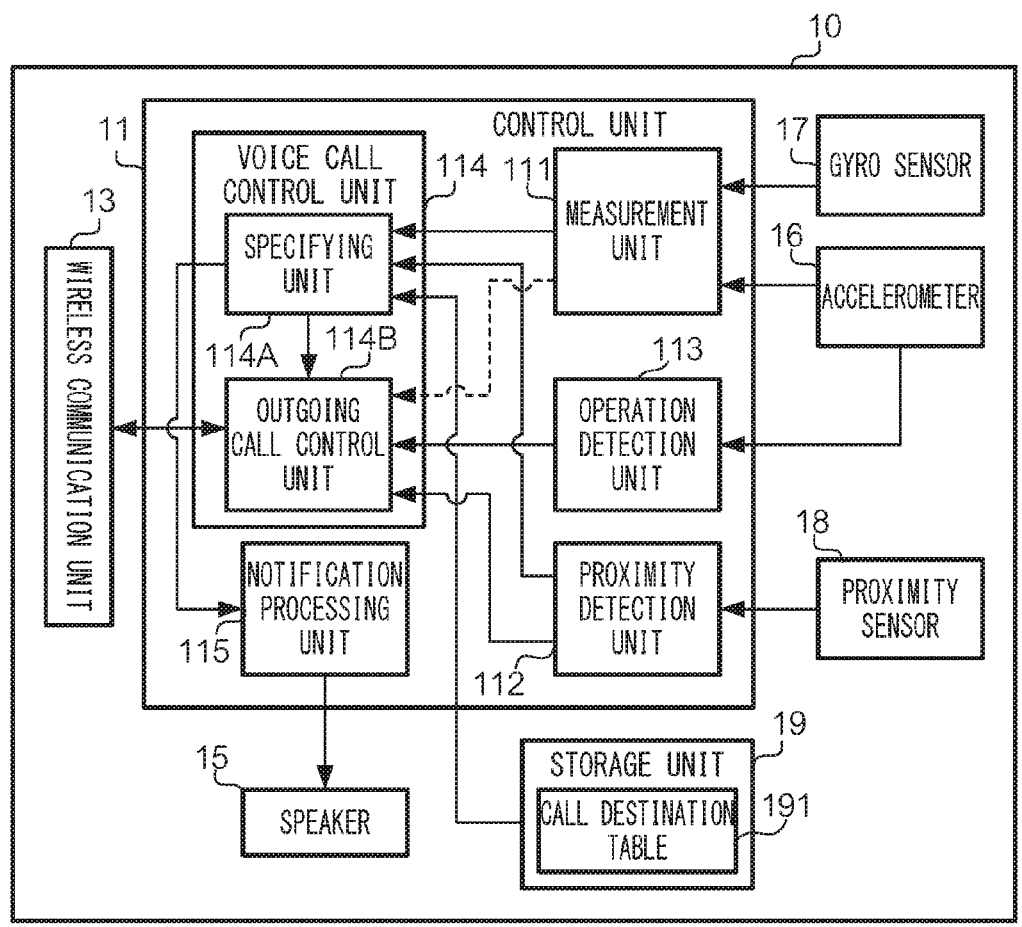
FIG. 3 is a diagram illustrating the configuration of a call destination table according to the same embodiment.
FIG. 4 is a block diagram illustrating the functional configuration of a control unit according to the same embodiment.

FIG. 3 is a diagram illustrating the configuration of call destination table 191. As illustrated in FIG. 3, call destination table 191 is a table in which call destination information and partner specifying conditions are registered in association with each other for each voice call partner.

The call destination information is information used for making an outgoing voice call. The call destination information is, for example, information directly or indirectly specifying a telephone number. The latter type of call destination information is, for example, a registration number for a telephone number in an address book, a speed dial number used for speed dialing, or the like. In FIG. 3, the call destination information is expressed as a name of the voice call partner (partner A or partner B).

The partner specifying conditions include a condition of an orientation or displacement of communication terminal device 10 for specifying the voice call partner. Here, the partner specifying condition is a pattern of a change over time in the orientation of communication terminal device 10 and the displacement of communication terminal device 10 when the user uses communication terminal device 10 with his/her right hand or left hand. Orientation/displacement pattern PA corresponding to partner A is a pattern occurring when the user uses communication terminal device 10 with his/her right hand. Orientation/displacement pattern PB corresponding to partner B is a pattern occurring when the user uses communication terminal device 10 with his/her left hand.

The partner specifying conditions are registered in call destination table 191 by the user, for example. In this case, the user carries out an operation when holding communication terminal device 10 in his/her right hand or left hand and makes a voice call. This operation includes, for example, an operation through which the user picks up communication terminal device 10 with his/her hand and brings the device near his/her own head area. Control unit 11 registers the partner specifying conditions on the basis of the change over time in the orientation of communication terminal device 10 and the displacement of communication terminal device 10 when this operation is carried out. The partner specifying conditions may be registered in call destination table 191 in advance. It is assumed that there are respective characteristics in change over time in the orientation of communication terminal device 10 and the displacement of communication terminal device 10 in the case where communication terminal device 10 is used with the right hand and in the case where communication terminal device 10 is used with the left hand.

FIG. 4 is a block diagram illustrating the functional configuration of control unit 11. Control unit 11 realizes functions corresponding to measurement unit 111, proximity detection unit 112, operation detection unit 113, voice call control unit 114, and notification processing unit 115 by executing programs. The broken line arrows in FIG. 4 indicate signal flows in a fourth embodiment, which will be described later.

Measurement unit 111 measures the orientation or displacement of communication terminal device 10 on the basis of the acceleration measured by accelerometer 16 and the angular velocity measured by gyrosensor 17.

Proximity detection unit 112 detects when the user's head area is near communication terminal device 10 on the basis of a detection result from proximity sensor 18. In the present embodiment, proximity detection unit 112 detects that the user's head area is near communication terminal device 10 in response to proximity sensor 18 having detected an object being near.

Operation detection unit 113 detects a predetermined operation being made by the user using communication terminal device 10. This operation does not include an operation of an operating unit realized by hardware or software (for example, touch screen unit 12 being operated). In the present embodiment, operation detection unit 113 detects an operation of tapping communication terminal device 10 (on a rear surface side thereof, for example) by the user on the basis of the acceleration measured by accelerometer 16.

Voice call control unit 114 carries out control pertaining to voice calls Voice call control unit 114 includes specifying unit 114A and outgoing call control unit 114B.

Specifying unit 114A specifies the voice call partner in the automatic outgoing call function. In the case where the user's head area is detected as being near by proximity detection unit 112, specifying unit 114A specifies the voice call partner on the basis of the orientation or displacement measured by measurement unit 111 before or during the detection of the user's head area being near (in other words, while the user's head area is detected as being near). Measurement results of the orientation or the displacement referenced to make this specification are, for example measurement results from a period or a point in time based on a point in time (a timing) at which the user's head area was detected as being near. In the case where the measured change over time in the orientation and the measured displacement meets a partner specifying condition in call destination table 191, specifying unit 114A specifies the partner corresponding to that partner specifying condition.

Outgoing call control unit 114B controls outgoing calling made by the automatic outgoing call function. Outgoing call control unit 114B calls the partner specified by specifying unit 114A. Outgoing call control unit 114B makes an outgoing call via wireless communication unit 13 on the basis of the call destination information held in call destination table 191. Outgoing call control unit 114B makes an outgoing call in the case where a user operation is detected by operation detection unit 113.

Notification processing unit 115 carries out notification processing for making a notification of the partner specified by the specifying unit 114A, by outputting audio via speaker 15. Notification processing unit 115 outputs, for example, the partner's name or music associated with the partner (a ringtone, for example). Notification processing unit 115 need not carry out this notification processing in the case where the automatic outgoing call function is not used and a partner has been specified by the user operating the operating unit.

Operations of communication terminal device 10 pertaining to the automatic outgoing call function will be described next.

Figure 5:
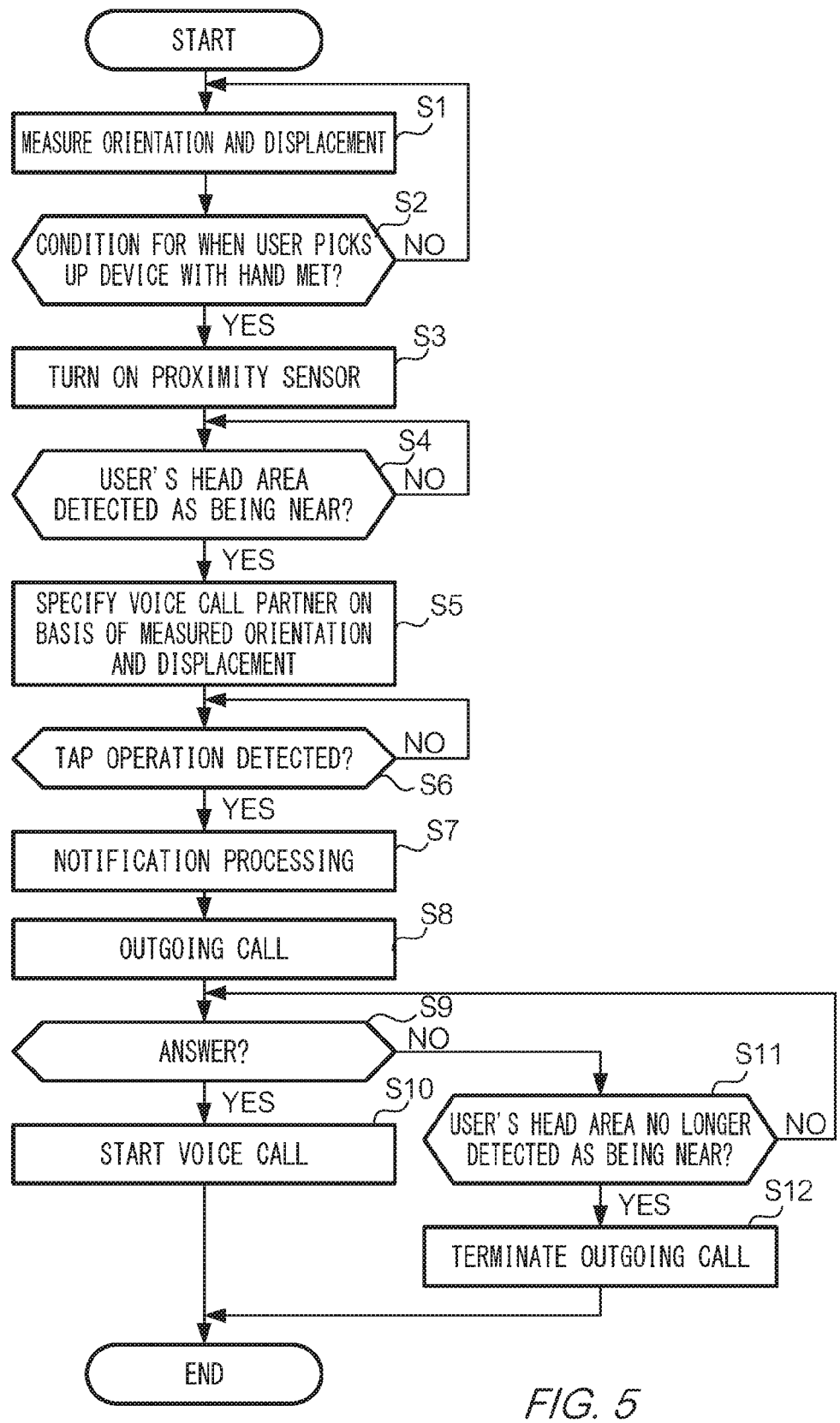
FIG. 5 is a flowchart illustrating processing pertaining to an automatic outgoing call function executed by the communication terminal device according to the same embodiment.
Figure 6:
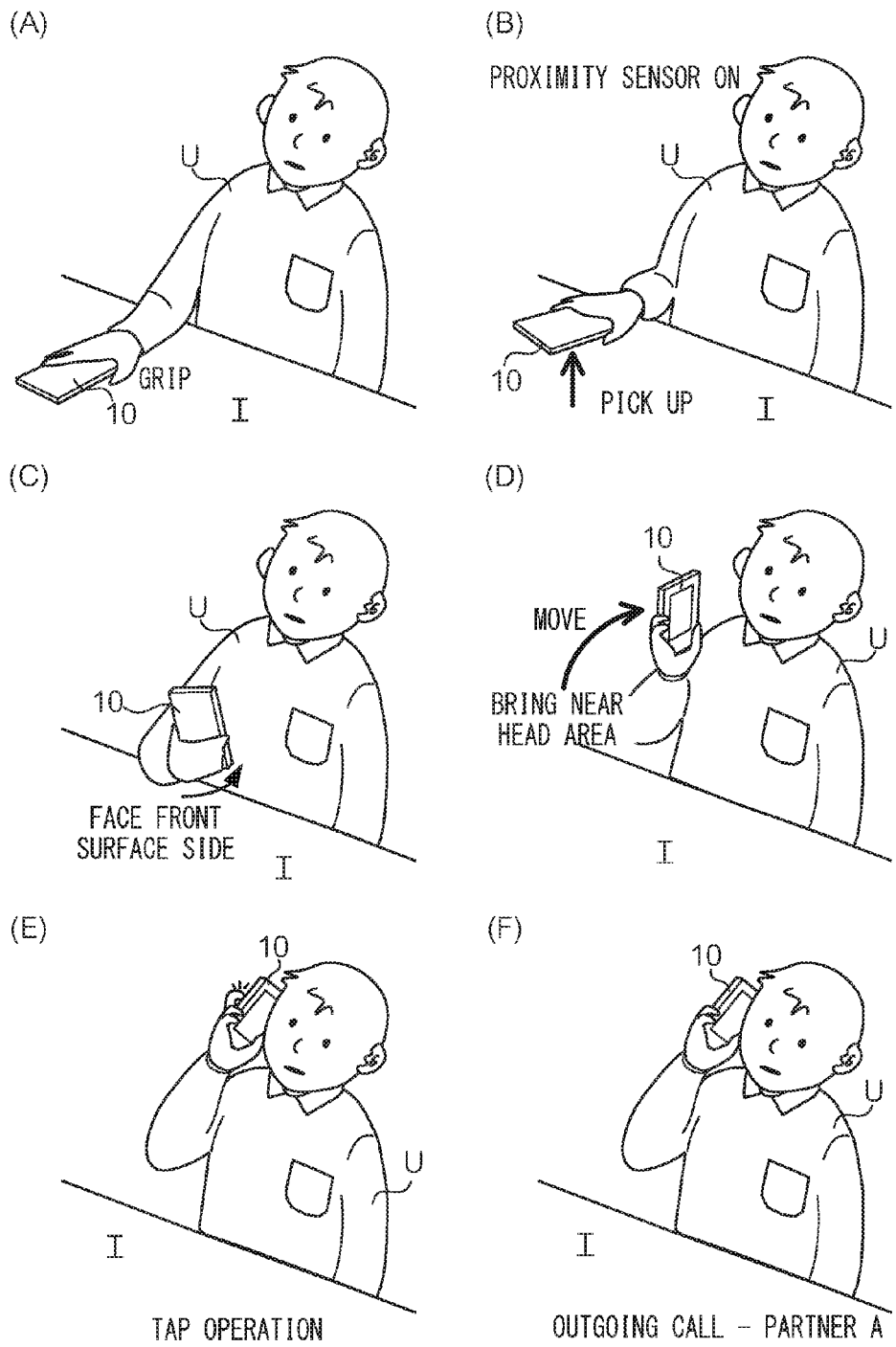
FIG. 6 is a descriptive diagram illustrating an example of states of a communication terminal device and a user (when using the device with a right hand).

FIG. 5 is a flowchart illustrating processing pertaining to the automatic outgoing call function executed by communication terminal device 10. FIG. 6 is a diagram illustrating an example of states of communication terminal device 10 and the user when making an outgoing voice call.

Control unit 11 measures the orientation and displacement of communication terminal device 10 using accelerometer 16 and gyrosensor 17 (step S1). It is assumed that during this period, control unit 11 also turns proximity sensor 18 off and does not detect whether or not an object is near.

Next, control unit 11 determines whether or not the measured orientation and displacement meet a condition established when the user picks up communication terminal device 10 with his/her hand (step S2). Here, control unit 11 determines that communication terminal device 10 has been picked up by the user's hand in the case where the orientation of communication terminal device 10 has changed over time or communication terminal device 10 has displaced.

Here, assume that communication terminal device 10 has been placed face-down on a horizontal table T in advance as illustrated in FIG. 6(A). In this case, user U who will make a voice call first grips communication terminal device 10 from a rear surface side thereof using his/her hand (the right hand, in this case). Next, as illustrated in FIG. 6(B), user U picks up communication terminal device 10 that s/he is gripping in his/her right hand. Then, as illustrated in FIG. 6(C), user U turns the front surface side of communication terminal device 10 toward him/herself. In this manner, an acceleration or angular velocity acts on communication terminal device 10 when communication terminal device 10 is held in the user's hand, which causes the orientation of communication terminal device 10 to change over time, causes communication terminal device 10 to displace, and so on.

Note that the condition established when the user picks up communication terminal device 10 with his/her hand is at least that an acceleration or an angular velocity has been produced. The condition may, for example, be that the orientation of communication terminal device 10 at a single point in time is a predetermined orientation (for example, an upright or nearly upright orientation). When in the upright orientation, a front surface of communication terminal device 10 is parallel or substantially parallel to a vertical direction.

Control unit 11 repeatedly measures the orientation and displacement of communication terminal device 10 until it is determined that the user has picked up communication terminal device 10 with his/her hand (step S2; NO). In the case of a determination of "YES" in step S2, control unit 11 turns proximity sensor 18 on and starts detecting whether or not an object is near (step S3).

Next, control unit 11 determines whether or not proximity sensor 18 has detected that the user's head area is near (step S4). In the case where control unit 11 does not detect the user's head area as being near (step S4; NO), the detection performed by proximity sensor 18 is repeated.

After turning the front surface side of communication terminal device 10 toward him/herself (FIG. 6(C)), user U moves communication terminal device 10 toward his/her own head area, as illustrated in FIG. 6(D). Upon the state illustrated in FIG. 6(D) being established, control unit 11 determines that the user's head area has been detected as being near by proximity sensor 18 (step S4; YES).

Next, control unit 11 specifies the voice call partner on the basis of the orientation or displacement of communication terminal device 10 measured before or while the user's head area is detected as being near (step S5). Control unit 11 determines whether the user holds communication terminal device 10 with his/her right hand or left hand and specifies the voice call partner on the basis of the measured orientation or displacement of communication terminal device 10 and the partner specifying condition in call destination table 191. Here, user U holds communication terminal device 10 with his/her right hand, and thus control unit 11 specifies partner A.

In step S5, control unit 11 refers to the measurement results in, for example, a period from when it is determined in step S2 that the condition occurring when the user holds communication terminal device 10 in his/her hand (in other words, when a determination of "YES" is made) to the current point in time when the user's head area is being detected as near. However, rather than referring to the entire period, control unit 11 may, for example, refer to the measurement results from the point in time when the user's head area was first detected as being near up until a predetermined amount of time as passed (in other words, the measurement results immediately before the user's head area was detected as being near). It is thought that doing so reduces the influence the state of communication terminal device 10 before being held by the user's hand (the position and orientation in which communication terminal device 10 was placed, for example) has on the specification of the voice call partner.

Next, control unit 11 determines whether or not an operation of tap communication terminal device 10 by the user has been detected on the basis of the acceleration measured by accelerometer 16 (step S6). In the case where it is determined that the operation of tap communication terminal device 10 has not been detected (step S6; NO), control unit 11 stands by as-is.

Assume that user U has performed an operation of tap communication terminal device 10 as illustrated in FIG. 6(E). In the case where this operation is detected, control unit 11 makes a determination of "YES" in step S6 and carries out the notification processing (step S7). Control unit 11 outputs audio for making a notification of the partner via speaker 15. Having heard this audio, the user can know the call destination of the automatic outgoing call function. Control unit 11 may furthermore carry out the notification processing for making a notification of the outgoing call by the automatic outgoing call function using a vibration function or the like.

Next, on the basis of the call destination information of the specified partner, control unit 11 calls the partner via wireless communication unit 13 (step S8). Here, control unit 11 calls partner A as illustrated in FIG. 6(F).

After the call is initiated, control unit 11 determines whether or not the partner has answered (step S9). In the case where it is determined that the partner has answered (step S9; YES), control unit 11 establishes a communication path for a voice call via the telephone line and starts the voice call (step S10). Thereafter, control unit 11 carries out control for voice calls.

In the case where a determination of "NO" is made in step S9, or in other words, in the case where it is determined that an answer from the partner is being waited for after the outgoing call was initiated, control unit 11 determines whether or not proximity sensor 18 no longer detects the user's head area as being near (step S11). In the case where it is determined that the user's head area is detected as being near (step S11; NO), control unit 11 returns to step S9. In the case where it is determined that the user's head area is no longer detected as being near (step S11; YES), control unit 11 terminates the outgoing call (step S12). This is because the user's head area no longer being detected as near may mean that the user no longer wishes to make a voice call using communication terminal device 10.

Note that control unit 11 turns proximity sensor 18 off after the voice call has started or after the voice call has been terminated.

Figure 7:
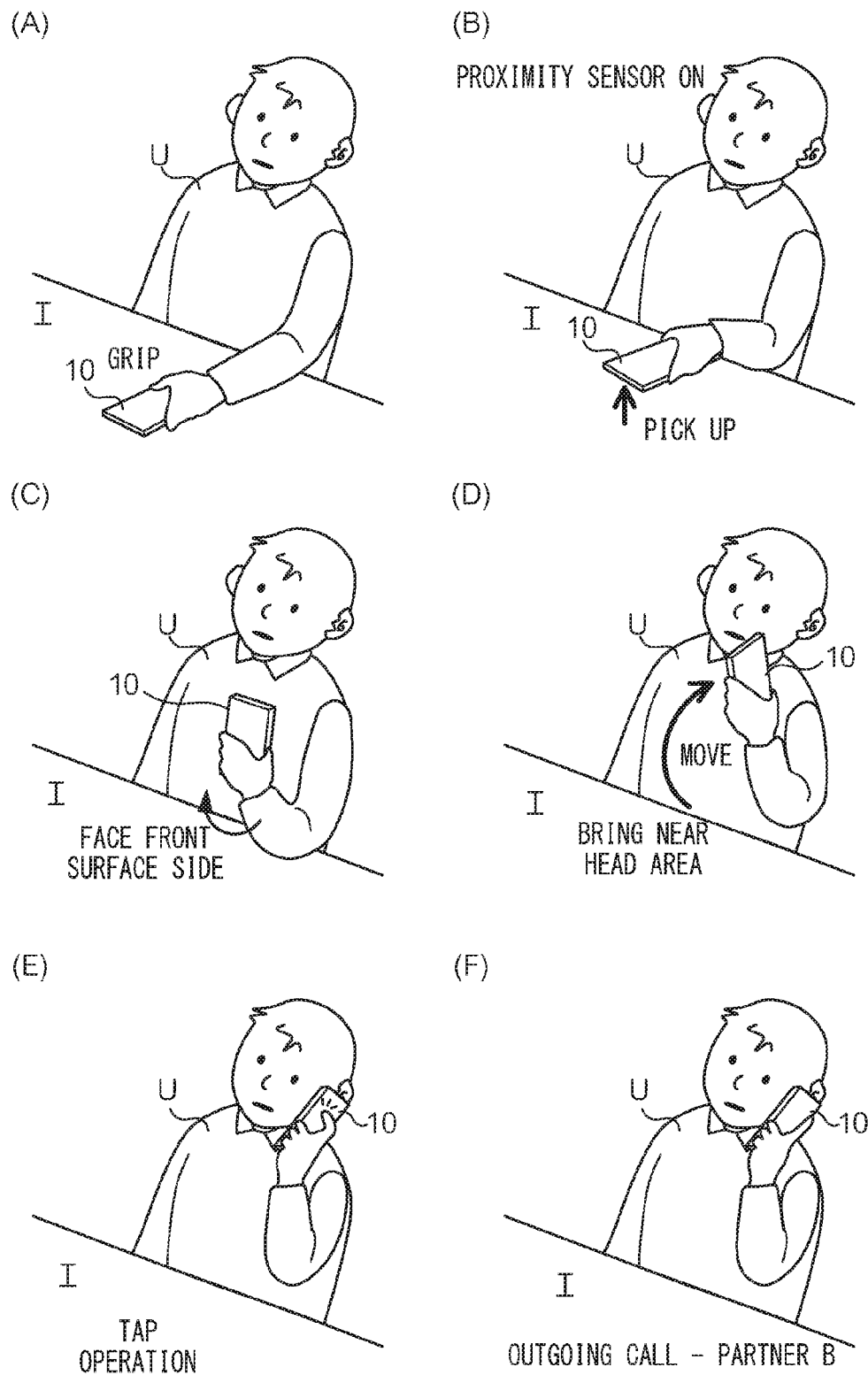
FIG. 7 is a descriptive diagram illustrating an example of states of a communication terminal device and a user (when using the device with a left hand).

As described above, communication terminal device 10 calls partner A in the case where the user holds communication terminal device 10 in his/her right hand. On the other hand, communication terminal device 10 calls partner B by performing the processing illustrated in FIG. 5 in the case where the user holds communication terminal device 10 in his/her left hand. In the case where user U uses communication terminal device 10 with his/her left hand, user U grips communication terminal device 10 with his/her left hand (FIG. 7(A)) and then lifts communication terminal device 10 (FIG. 7(B)). Next, user U turns the front surface side of communication terminal device 10 toward him/herself (FIG. 7(C)), and brings communication terminal device 10 close to his/her own head area (FIG. 7(D)). Next, when the voice call is to be started, user U performs the operation of tap communication terminal device 10 (FIG. 7(E)). Communication terminal device 10 then calls partner B as illustrated in FIG. 7(F).

As described thus far, in the case where it has been detected that communication terminal device 10 has been moved near the user's head area, communication terminal device 10 specifies the voice call partner on the basis of the orientation and displacement detected during that period. Accordingly, the user of communication terminal device 10 can cause communication terminal device 10 to call his/her desired voice call partner by carrying out a natural operation performed when holding communication terminal device 10 in his/her hand, without operating an operating unit.

In addition, communication terminal device 10 makes an outgoing call in the case where a tap operation made by the user is detected. Accordingly, communication terminal device 10 is unlikely to make an outgoing call at the wrong time using the automatic outgoing call function. Furthermore, the user need not specify a partner, instruct an outgoing call to be made, or the like by operating an operating unit (operating touch screen unit 12, for example). Accordingly, even in the case where the user is unaccustomed to operating touch screen unit 12, the user will feel little burden with respect to operations for starting voice calls.

Second Embodiment

Communication terminal device 10 according to the present embodiment specifies the voice call partner on the basis of an orientation measured at a single point in time while the user's head area is detected as being near, in addition to the hand with which the user holds communication terminal device 10. This orientation is, for example, an orientation occurring when communication terminal device 10 makes contact with the user's head area (ear).

In the present embodiment, elements having the same reference numerals as those in the above-described first embodiment have equivalent functions as those in the above-described first embodiment. The hardware configuration and functional configuration of communication terminal device 10 according to the present embodiment is for the most part the same as in the above-described first embodiment. However, specifying unit 114A specifies the voice call partner on the basis of an orientation measured at a single point in time while the user's head area is detected as being near.

FIG. 8 is a diagram illustrating the configuration of call destination table 191 according to the present embodiment. FIG. 9 is a diagram illustrating orientations measured while a user's head area is detected as being near.

As illustrated in FIG. 8, call destination information and partner specifying conditions are registered in call destination table 191 for each of partners A to D. The partner specifying conditions corresponding to partner A are specified by the same orientation/displacement pattern PA as in the above-described first embodiment, and by a forward-tilting orientation. As illustrated in FIG. 9(A), the forward-tilting orientation is an orientation in which communication terminal device 10 is tilted such that the height thereof drops as the device progresses forward, from the perspective of user U. Thus partner A is called when user U places communication terminal device 10 at his/her right ear in the forward-tilting orientation. The partner specifying conditions corresponding to partner B are specified by the same orientation/displacement pattern PB as in the above-described first embodiment, and by a forward-tilting orientation. Thus partner B is called when user U places communication terminal device 10 at his/her left ear in the forward-tilting orientation as illustrated in FIG. 9(B).

The partner specifying conditions corresponding to partner C are specified by the orientation/displacement pattern PA and by a rearward-tilting orientation. As illustrated in FIG. 9(C), the rearward-tilting orientation is an orientation in which communication terminal device 10 is tilted such that the height thereof drops as the device progresses rearward, from the perspective of user U. Thus partner C is called when user U places communication terminal device 10 at his/her right ear in the rearward-tilting orientation. The partner specifying conditions corresponding to partner D are specified by the orientation/displacement pattern PB and by a rearward-tilting orientation. Thus partner D is called when user U places communication terminal device 10 at his/her left ear in the rearward-tilting orientation as illustrated in FIG. 9(D).

Note that the orientation of communication terminal device 10 after the call destination has been specified need not be one of the orientations illustrated in FIGS. 9(A) to (D), and may be an orientation at which it is easy for the user to make a voice call.

The processing pertaining to the automatic outgoing call function executed by communication terminal device 10 is for the most part the same as the processing illustrated in FIG. 5. However, control unit 11 of communication terminal device 10 uses gyrosensor 17 to measure the orientation at a single point in time while communication terminal device 10 detects the user's head area as being near, and determines whether the orientation is the forward-tilting orientation or the rearward-tilting orientation. Although the point in time of this measurement may be any point in time while the user's head area is detected as being near, the point in time is, for example, a point in time when communication terminal device 10 is closest to the user's head area, and more specifically, a point in time when communication terminal device 10 makes contact with the user's head area.

In step S5, control unit 11 specifies the voice call partner by referring to call destination table 191 on the basis of the hand used by the user and orientation measured at the single point of time while the user's head area is detected as being near. Other processing is the same as that described above in the first embodiment.

According to the automatic outgoing call function described thus far, communication terminal device 10 can call a greater number of types of partners using the automatic outgoing call function than with the configuration according to the first embodiment described above.

Note that communication terminal device 10 may specify the voice call partner on the basis of only an orientation measured at a single point in time while the user's head area is detected as being near. Additionally, the aforementioned forward-tilting orientation and rearward-tilting orientation are merely examples of orientations occurring while the user's head area is detected as being near. The orientations occurring while the user's head area is detected as being near may be more finely subdivided. This makes it possible to further increase the number of types of partners that can be called using the automatic outgoing call function.

Third Embodiment

Communication terminal device 10 according to the present embodiment specifies a voice call partner on the basis of an operation carried out by the user using communication terminal device 10, in addition to the hand of the user using communication terminal device 10.

In the present embodiment, elements having the same reference numerals as those in the above-described first embodiment have equivalent functions as those in the above-described first embodiment. The hardware configuration and functional configuration of communication terminal device 10 according to the present embodiment is for the most part the same as in the above-described first embodiment. However, specifying unit 114A specifies the voice call partner on the basis of the measured orientation of communication terminal device 10 and an operation detected while the user's head area is detected as being near. This operation is an operation of tap communication terminal device 10, as described earlier.

FIG. 10 is a diagram illustrating the configuration of call destination table 191 according to the present embodiment. FIG. 11 is a diagram illustrating operations carried out by the user while the user's head area is detected as being near.

As illustrated in FIG. 10, call destination information and partner specifying conditions are registered in call destination table 191 for each of the partners A to D. The partner specifying conditions corresponding to partner A are specified by the same orientation/displacement pattern PA as in the above-described first embodiment, and by an operation of tap communication terminal device 10 once. Thus partner A is called when user U places communication terminal device 10 at his/her right ear and taps communication terminal device 10 once, as illustrated in FIG. 11(A). The partner specifying conditions corresponding to partner B are specified by the same orientation/displacement pattern PB as in the above-described first embodiment, and by an operation of tap communication terminal device 10 once. Thus partner B is called when user U places communication terminal device 10 at his/her left ear and taps communication terminal device 10 once, as illustrated in FIG. 11(B). The partner specifying conditions corresponding to partner C are specified by the orientation/displacement pattern PA, and by an operation of tap communication terminal device 10 twice.

Thus partner C is called when user U places communication terminal device 10 at his/her right ear and taps communication terminal device 10 twice, as illustrated in FIG. 11(C). The partner specifying conditions corresponding to partner D are specified by the orientation/displacement pattern PB, and by an operation of tap communication terminal device 10 twice. Thus partner D is called when user U places communication terminal device 10 at his/her left ear and taps communication terminal device 10 twice, as illustrated in FIG. 11(D).

Figure 12:
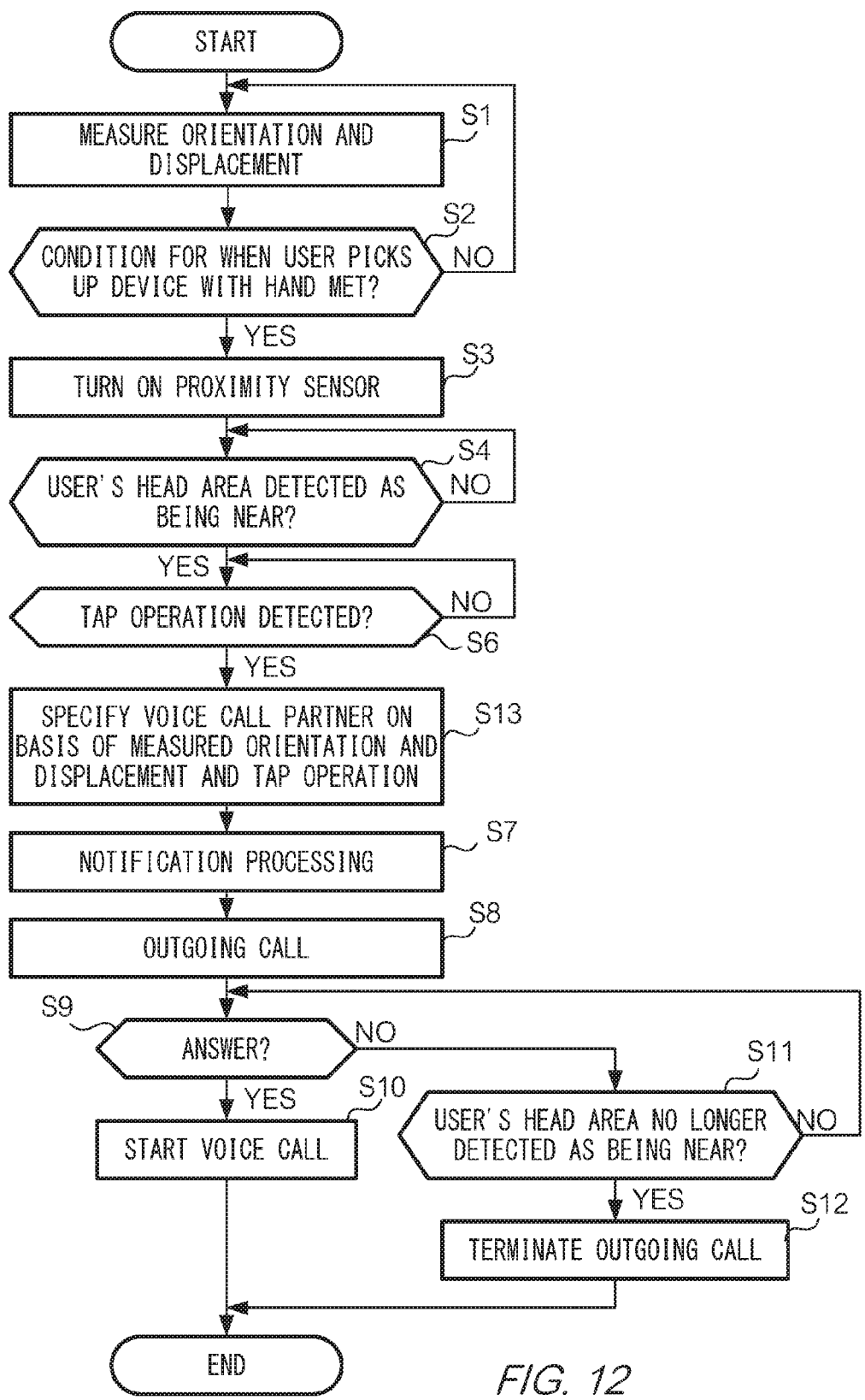
FIG. 12 is a flowchart illustrating processing pertaining to an automatic outgoing call function executed by the communication terminal device according to the same embodiment.

FIG. 12 is a flowchart illustrating processing pertaining to the automatic outgoing call function executed by communication terminal device 10.

Control unit 11 first executes the processing of steps S1 to S4; next, in the case where it is determined that the operation of tap communication terminal device 10 by the user has been detected (step S6; YES), control unit 11 specifies the voice call partner on the basis of the measured orientation and displacement of communication terminal device 10 (here, the hand used by the user) and the detected tap operation (step S13). Control unit 11 specifies the voice call partner by referring to call destination table 191. Thereafter, control unit 11 executes the processing steps of steps S7 to S12 according to the same procedure as that described above in the first embodiment.

According to the automatic outgoing call function described thus far, communication terminal device 10 can call a greater number of types of partners using the automatic outgoing call function than with the configuration according to the first embodiment described above.

Note that communication terminal device 10 may specify the voice call partner on the basis of an orientation measured at a single point in time while the user's head area is detected as being near, as described above in the second embodiment, and a tap operation carried out by the user. Additionally, the aforementioned tap operation may be carried out three or more times. This makes it possible to further increase the number of types of partners that can be called using the automatic outgoing call function. Furthermore, the strength of the tap operation, a tap operation pattern, or the like may be used instead of the number of tap operations.

Fourth Embodiment

According to the above-described embodiments, in the case where the user's head area is no longer detected as being near after the outgoing call is initiated in step S8, communication terminal device 10 terminates the outgoing call. As opposed to this, in the present embodiment, communication terminal device 10 specifies an orientation to serve as a condition for terminating the outgoing call, in accordance with the orientation of communication terminal device 10 after the outgoing call has been initiated.

In the present embodiment, elements having the same reference numerals as those in the above-described first embodiment have equivalent functions as those in the above-described first embodiment. The hardware configuration and functional configuration of communication terminal device 10 according to the present embodiment is for the most part the same as in the above-described first embodiment. However, in the case where measurement unit 111 has measured an orientation or displacement that meets a predetermined condition (called an "outgoing call terminating condition" hereinafter) after an outgoing call to a specified partner has been initiated, outgoing call control unit 114B terminates that outgoing call.

Figure 13:
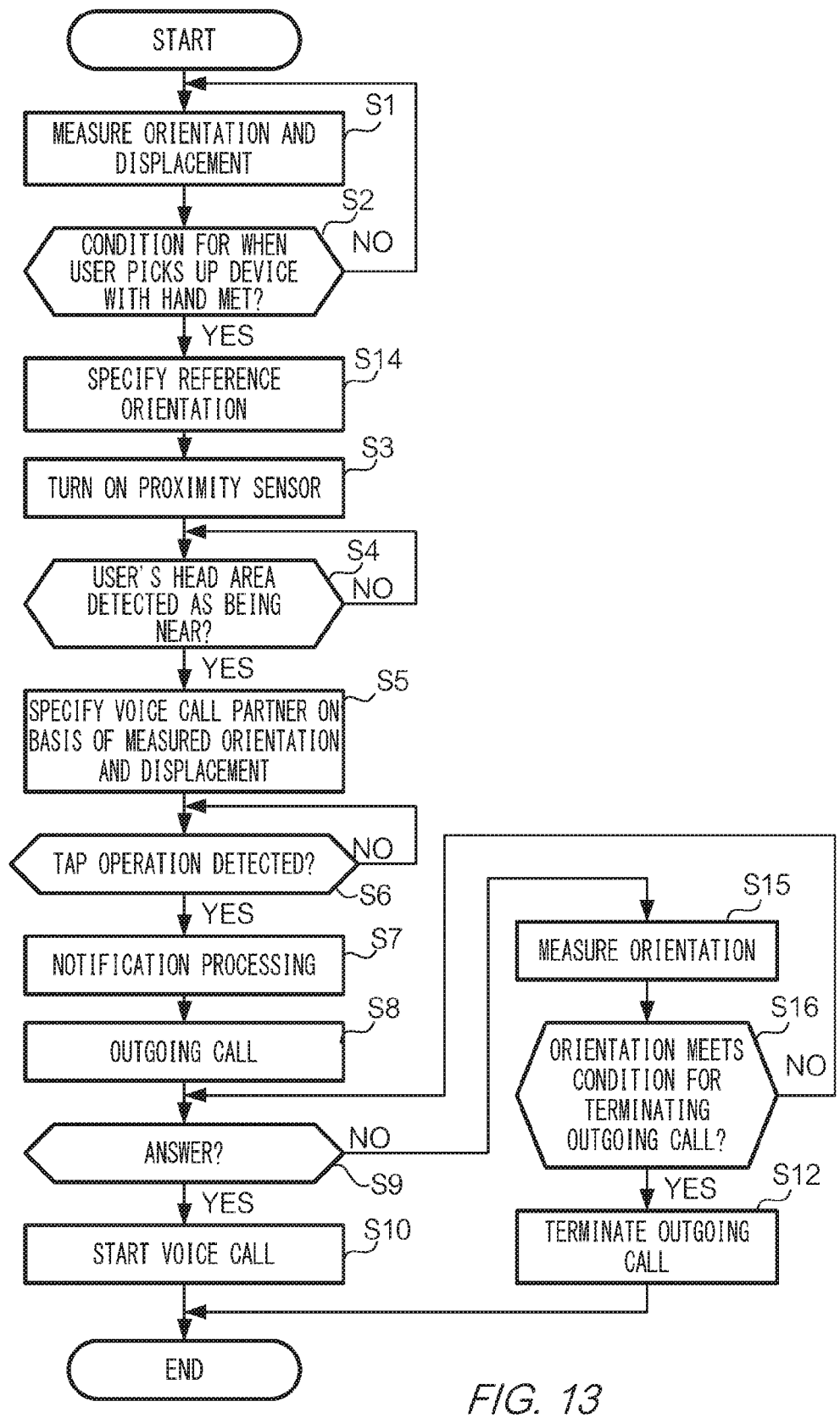
FIG. 13 is a flowchart illustrating processing pertaining to an automatic outgoing call function executed by a communication terminal device according to a fourth embodiment of the present invention.
Figure 14:
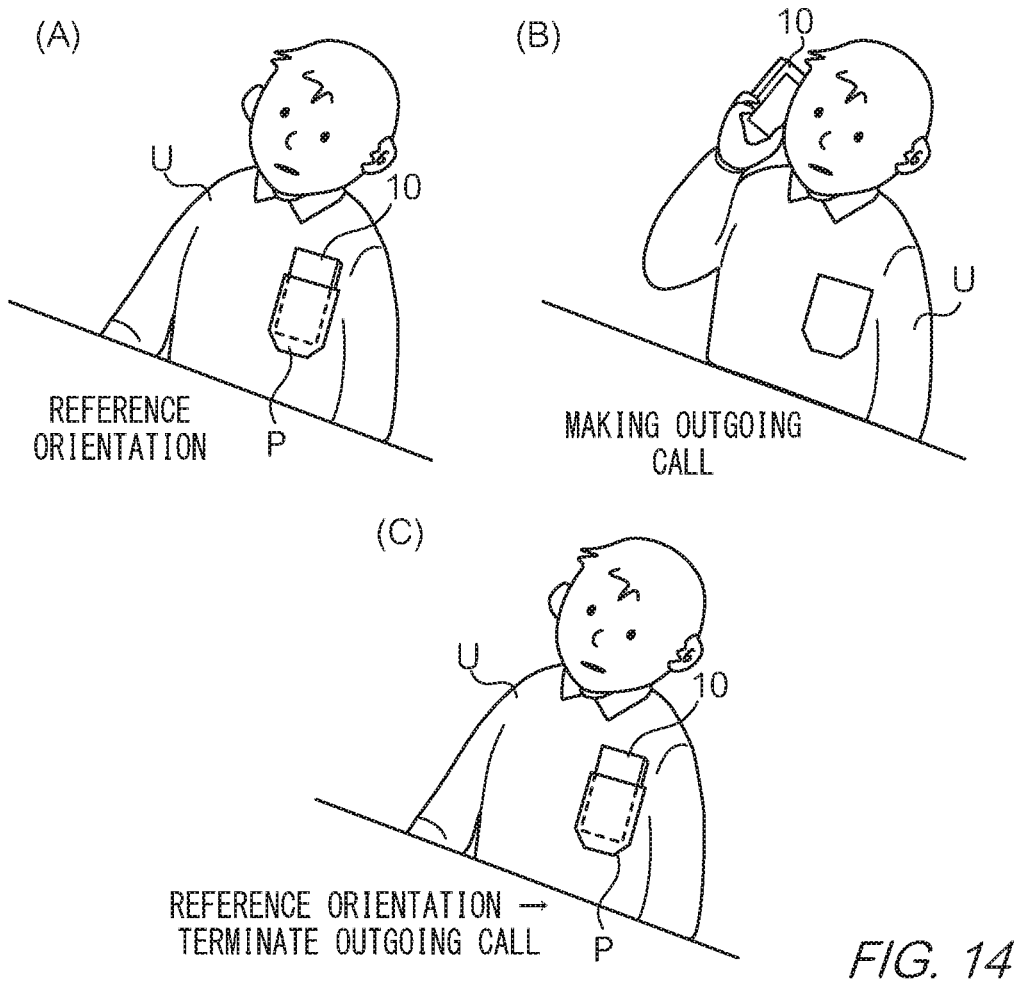
FIG. 14 is a descriptive diagram illustrating an example of states of a communication terminal device and a user when making an outgoing voice call.

FIG. 13 is a flowchart illustrating processing pertaining to the automatic outgoing call function executed by communication terminal device 10. FIG. 14 is a diagram illustrating an example of states of communication terminal device 10 and the user when making an outgoing voice call.

In the case where it is determined that a condition when the user holds communication terminal device 10 with his/her hand is met (step S2; YES), control unit 11 specifies a reference orientation (step S14). The reference orientation is an orientation occurring before the user holds communication terminal device 10 with his/her hand. In the case where communication terminal device 10 is stored in chest pocket P of user U as illustrated in FIG. 14(A), control unit 11 specifies the orientation of communication terminal device 10 illustrated in FIG. 14(A) as the reference orientation. Control unit 11 causes orientation data expressing the reference orientation to be stored in storage unit 19.

Then, control unit 11 initiates the outgoing call in step S8, and in the case where it is determined that there is no answer from the partner (step S9; NO), advances to step S15. Control unit 11 then measures the orientation at the current point in time (step S15) and determines whether or not the measured orientation meets the outgoing call terminating condition (step S16). The outgoing call terminating condition is that the orientation measured in step S15 is the reference orientation expressed by the orientation data stored in storage unit 19. Here, in the case where it is determined that the orientation is not the reference orientation (step S16; NO), control unit 11 returns to step S9 and maintains the outgoing call state.

Then, in the case where it is determined that the orientation measured in step S15 is the reference orientation (step S16; YES), control unit 11 terminates the outgoing call (step S12). As illustrated in FIG. 14(B), an outgoing call is being made by the automatic outgoing call function in a state where user U has placed communication terminal device 10 at his/her ear. When user U then stores communication terminal device 10 in chest pocket P, communication terminal device 10 is in the reference orientation or an orientation similar thereto, as illustrated in FIG. 14(C). Accordingly, control unit 11 terminates the outgoing call.

The outgoing call terminating condition may include a condition aside from the measured orientation being the reference orientation. For example, control unit 11 may determine that the outgoing call terminating condition is met in the case where a change in the orientation of greater than or equal to a predetermined angle is measured after the point in time when the outgoing call was initiated. Alternatively, control unit 11 may determine that the outgoing call terminating condition is met in the case where a change over time in the orientation of communication terminal device 10 or the displacement of communication terminal device 10 is the reverse of a change in the orientation over time and the displacement measured when there is an incoming call.

According to communication terminal device 10 of the present embodiment, an outgoing call can be terminated by detecting a natural operation made by the user when making a voice call while holding communication terminal device 10 in his/her hand, without the user operating an operating unit.

Note that like the above-described first embodiment, communication terminal device 10 according to the present embodiment may terminal the outgoing call in the case where the user's head area is no longer detected as being near after the outgoing call is initiated in step S8. Although the present embodiment describes a case where communication terminal device 10 is stored in chest pocket P, the same effects can be achieved even in cases where communication terminal device 10 is stored in another location, in another orientation, and so on.

Fifth Embodiment

Communication terminal device 10 according to the present embodiment differs from the configurations in the above-described embodiments in that the automatic outgoing call function is not permitted to make an outgoing call in a period where audio is being outputted. This is because in such a period, it is possible that the user is using a function of communication terminal device 10 aside from the automatic outgoing call function.

Figure 15:
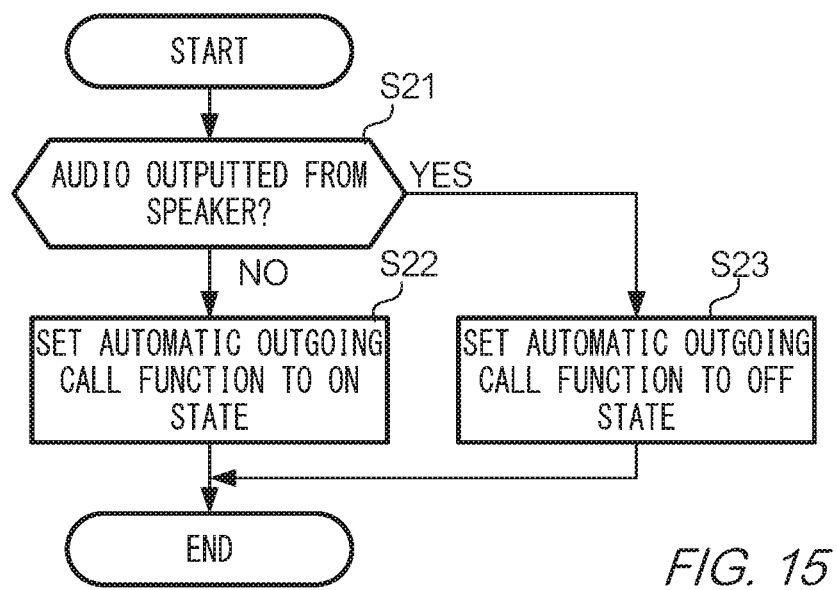
FIG. 15 is a flowchart illustrating typical processing executed by a communication terminal device according to a fifth embodiment of the present invention.

FIG. 15 is a flowchart illustrating typical processing pertaining executed by communication terminal device 10 according to the present embodiment. Communication terminal device 10 executes the processing illustrated in FIG. 15 in sequence in a period when the power is turned on, for example.

First, control unit 11 of communication terminal device 10 determines whether or not audio is being outputted via speaker 15 (step S21). Control unit 11 determines whether or not audio is being outputted via speaker 15 on the basis of a voice signal expressing voice picked up by microphone 14, for example. For example, control unit 11 determines that audio is being outputted in the case where a level (a volume, for example) of the voice signal is greater than or equal to a threshold, and determines that audio is not being outputted in the case where the level of the voice signal is less than the threshold. Furthermore, control unit 11 may determine that audio is being outputted via speaker 15 under the condition that the voice signal expresses an electronic sound. Additionally, control unit 11 may determine whether or not audio is being outputted from speaker 15 by obtaining the voice signal supplied to speaker 15. In this case, control unit 11 analyzes the obtained voice signal and determines whether or not audio is being outputted on the basis of a change over time in an audio waveform, for example.

In the case where it is determined in step S21 that audio is not being outputted (step S21; NO), control unit 11 puts the automatic outgoing call function in an on state (step S22). In step S22, for example, control unit 11 causes a permit flag, which is a flag permitting the use of the automatic outgoing call function, to be stored in RAM 11C or storage unit 19. Control unit 11 permits a partner specified by the automatic outgoing call function to be called during a period when this permit flag is stored.

In the case where it is determined in step S21 that audio is being outputted (step S21; YES), control unit 11 puts the automatic outgoing call function in an off state (step S23). In step S23, for example, control unit 11 causes a prohibit flag, which is a flag prohibiting the use of the automatic outgoing call function, to be stored in RAM 11C or storage unit 19. Control unit 11 does not execute processing pertaining to the automatic outgoing call function, and does not permit (that is, prohibits) a partner specified by the automatic outgoing call function to be called, during a period where the prohibit flag is stored.

Here, consider a case where communication terminal device 10 makes an outgoing call on the basis of a different voice call function from the automatic outgoing call function. This voice call function is, for example, executed on the basis of an application program stored in storage unit 19. In the case where this voice call function is executed, it is possible that the user will carry out operations illustrated in FIGS. 6 and 7. However, in a period where an outgoing call is made on the basis of this voice call function and audio related to that voice call function (a melody used when making an outgoing call, for example) is therefore being outputted via speaker 15, control unit 11 does not permit an outgoing call to be made by the automatic outgoing call function.

Next, consider a case where communication terminal device 10 is playing back content (audio content or video content, for example) and is therefore outputting audio via speaker 15. In a period where content is being played back, it is possible that the user will perform the operations illustrated in FIGS. 6 and 7 in order to better hear the audio from speaker 15 or the like. However, in a period where audio from the content being played back is being outputted via speaker 15, control unit 11 does not permit an outgoing call to be made by the automatic outgoing call function.

In addition to a period in which audio is being outputted via speaker 15, control unit 11 may also not permit an outgoing call to be made by the automatic outgoing call function in a period where communication terminal device 10 is outputting audio via an externally-connected earphone, an external device such as a speaker, or the like.

According to communication terminal device 10 of the present embodiment as described thus far, a situation where an outgoing call is made by the automatic outgoing call function at the wrong time can be avoided by using audio outputted from communication terminal device 10 as an indicator.

In the present embodiment, the configuration is such that an outgoing call made by the automatic outgoing call function is not permitted in a period where audio is being outputted from communication terminal device 10. However, rather than being limited to the output of audio, communication terminal device 10 may not permit outgoing calls to be made by the automatic outgoing call function in cases where the user is using a function where it is undesirable for the automatic outgoing call function to be implemented or a function that competes with the automatic outgoing call function, such as a case where a voice translation function is being used, for example.

Sixth Embodiment

Communication terminal device 10 according to the present embodiment differs from the configurations of the above-described embodiments in that the voice call partner specified when the orientation or displacement expressed by a predetermined orientation/displacement pattern was measured is varied depending on the occasion when that measurement was taken. Configuration Example 1 to Configuration Example 3 will be described hereinafter as examples of the configuration the present embodiment.

Configuration Example 1: Time-Based Condition

FIG. 16 is a diagram illustrating the configuration of call destination table 191A according to Configuration Example 1. As illustrated in FIG. 16, call destination table 191A is a table in which a time-based condition, call destination information, and partner specifying conditions are registered in association with each other. Here, the time-based condition is divided into two groups based on the day of the week, namely "Mon-Fri" (weekdays, Mon-Fri) and "Sat and Holidays". Additionally, in call destination table 191A, voice call partner call destination information that differs between the "Mon-Fri" and the "Sat and Holidays" time-based conditions are associated with a single partner specifying condition. Here, with "orientation/displacement pattern PA", call destination information for "partner A" is associated on "Mon-Fri", whereas call destination information for "partner C" is associated on "Sat and Holidays". Meanwhile, with "orientation/displacement pattern PB", call destination information for "partner B" is associated on "Mon-Fri", whereas call destination information for "partner D" is associated on "Sat and Holidays". Partners A and B are people with whom the user makes voice calls with comparatively frequently on weekdays, such as people at the user's workplace. Partners C and D are people with whom the user makes voice calls with comparatively frequently on days off, such as friends.

In step S5, control unit 11 (specifying unit 114A) specifies the voice call partner on the basis of the measured orientation and displacement and the point in time at which that orientation and displacement were measured (here, the day of the week of the measurement). Here, in the case where an orientation and displacement expressing "orientation/displacement pattern PA" have been measured, control unit 11 specifies "partner A" when that day is "Mon-Fri" and specifies "partner C" when that day is "Sat and Holidays". Meanwhile, in the case where an orientation and displacement expressing "orientation/displacement pattern PB" have been measured, control unit 11 specifies "partner B" when that day is "Mon-Fri" and specifies "partner D" when that day is "Sat and Holidays". Control unit 11 then executes the processing of step S6 and on so as to call the specified partner.

Although a case where the specification is made using a time-based condition corresponding to a day of the week is described here, the specification may be carried out using a time-based element aside from the day of the week, such as a time, a date, a month, or the like. Additionally, the time-based condition may be divided into three or more segments.

According to Configuration Example 1 as described thus far, communication terminal device 10 can change the call destination of the automatic outgoing call function in accordance with a time-based condition met when the user attempts to make a voice call. By registering the call destination information of partners with which the user frequently makes voice calls when certain time-based conditions are met in call destination table 191A, communication terminal device 10 can accurately specify the partner with which the user is attempting to make a voice call.

Configuration Example 2: Location-Based Condition

FIG. 17 is a diagram illustrating the configuration of call destination table 191B according to Configuration Example 2. As illustrated in FIG. 17, call destination table 191B is a table in which a location-based condition, call destination information, and partner specifying conditions are registered in association with each other. Here, the location-based condition is divided into two groups, namely "workplace" and "non-workplace". Information of the location-based condition is expressed by latitude and longitude information, for example, but may be expressed by other information instead. Additionally, in call destination table 191B, voice call partner call destination information that differs between the "workplace" and the "non-workplace" location-based conditions are associated with a single partner specifying condition. Here, with the "orientation/displacement pattern PA", call destination information for "partner A" is associated for "workplace", whereas call destination information for "partner C" is associated for "non-workplace". Meanwhile, with the "orientation/displacement pattern PB", call destination information for "partner B" is associated for "workplace", whereas call destination information for "partner D" is associated for "non-workplace". Partners A and B are people with whom the user makes voice calls with comparatively frequently during work, such as people at the user's workplace. Partners C and D are people with whom the user makes voice calls with comparatively frequently outside of work, such as friends.

In step S5, control unit 11 (specifying unit 114A) specifies the voice call partner on the basis of the measured orientation and displacement and the place (location) at which that orientation and displacement were measured. Control unit 11 specifies the location of its host communication terminal device on the basis of, for example, a positioning function provided in communication terminal device 10 (a Global Positioning System (GPS) function, for example), a base station positioning function, or the like. Then, in the case where an orientation and displacement expressing "orientation/displacement pattern PA" have been measured, control unit 11 specifies "partner A" in the case where the location at the point in time of those measurements is "workplace", and specifies "partner C" in the case where the location at the point in time of those measurements is "non-workplace". Meanwhile, in the case where an orientation and displacement expressing "orientation/displacement pattern PB" have been measured, control unit 11 specifies "partner B" in the case where the location at the point in time of those measurements is "workplace", and specifies "partner D" in the case where the location at the point in time of those measurements is "non-workplace". Control unit 11 then executes the processing of step S6 and on so as to call the specified partner.

Although a case where the workplace is specified as workplace or non-workplace is described here, the location may be specified using another location-based element (position-based element), such as home or travel destination. Additionally, the location-based condition may be divided into three or more segments.

According to Configuration Example 2 as described thus far, communication terminal device 10 can change the call destination of the automatic outgoing call function in accordance with a location-based condition met when the user attempts to make a voice call. By registering the call destination information of partners with which the user frequently makes voice calls when certain location-based conditions are met in call destination table 191B, communication terminal device 10 can accurately specify the partner with which the user is attempting to make a voice call.

FIG. 18 is a diagram illustrating the configuration of schedule data 192 of the user of communication terminal device 10, which is stored in storage unit 19. Schedule data 192 is generated and stored on the basis of a scheduler executed by control unit 11. The scheduler is software for managing a user's schedule. For example, for each event registered by the scheduler (activity plans, for example), schedule data 192 includes information of a date on which that event is to be carried out, people related to the event (participants and accompanying members, for example), and the place where the event will be held.

In step S5, control unit 11 (specifying unit 114A) specifies the voice call partner on the basis of the measured orientation and displacement and schedule data 192 of the user.

Here, consider a case where schedule data 192 in the upper section of FIG. 18, in which a point in time at which an orientation and displacement expressing a predetermined orientation/displacement pattern have been measured or a date/time corresponding to a point in time within a predetermined period following the stated point in time is specified, is stored. In this case, control unit 11 uses people related to the event as voice call partner candidates. Here, control unit 11 uses partner A and partner D as voice call partner candidates. Then, for example, control unit 11 specifies "partner A" in the case where an orientation and displacement expressing "orientation/displacement pattern PA" have been measured, and specifies "partner D" in the case where an orientation and displacement expressing "orientation/displacement pattern PB" have been measured.

Although control unit 11 specifies a correspondence relationship between the orientation/displacement pattern and the people related to the event on the basis of a user instruction, the correspondence relationship may be specified through a different method.

The voice call partner may be specified using schedule data 192 through the following method. Note, however, that it is assumed that call destination table 191B illustrated in FIG. 17 is also stored in storage unit 19.

Here, consider a case where schedule data 192 in the lower section of FIG. 18, in which a point in time at which an orientation and displacement expressing a predetermined orientation/displacement pattern have been measured or a date/time corresponding to a point in time within a predetermined period following the stated point in time is specified, is stored. In this case, control unit 11 specifies the voice call partner on the basis of the place where the event will be held. Here, "workplace" is registered as the place where the event will be held, and thus control unit 11 assumes the partner associated with the location-based condition "workplace" in call destination table 191B is a person related to the event and takes that partner as a voice call partner candidate. Then, for example, control unit 11 specifies "partner A" in the case where an orientation and displacement expressing "orientation/displacement pattern PA" have been measured, and specifies "partner B" in the case where an orientation and displacement expressing "orientation/displacement pattern PB" have been measured.

According to Configuration Example 3 as described thus far, communication terminal device 10 can change the call destination of the automatic outgoing call function in accordance with schedule data 192. In the case where a person related to an event registered by the scheduler is present, it is assumed to be comparatively likely that the user will attempt to make a voice call with that person at the date/time when the event will be held or at a point in time near that date/time. As such, according to Configuration Example 3, communication terminal device 10 can accurately specify the partner with which the user wishes to make a voice call on the basis of schedule data 192.

Note that communication terminal device 10 may have two or more of the configurations described in Configuration Example 1 to Configuration Example 3.

Variations

The present invention can be carried out in other forms aside from those in the above-described embodiments. The present invention can also be carried out in the following forms, for example. The variations described hereinafter may also be combined as appropriate.

Variation 1

Communication terminal device 10 may have a configuration realized by combining the configurations according to two or more of the above-described first to sixth embodiments.

Variation 2

Communication terminal device 10 may, in the automatic outgoing call function, detect an operation aside from the tap operation made by the user.

For example, the operation carried out by the user using communication terminal device 10 may be another operation of the user applying an external force on communication terminal device 10. For example, control unit 11 may make an outgoing call under a condition where an operation of shaking communication terminal device 10 is detected using accelerometer 16 while the user is detected as being near. Additionally, the operation made by the user using communication terminal device 10 may be an utterance made by the user. For example, control unit 11 may make an outgoing call under a condition where a user utterance is detected via microphone 14 while the user is detected as being near.

In this manner, communication terminal device 10 may make an outgoing call using the automatic outgoing call function in the case where an operation that is carried out in a state where the user can make a voice call and is an operation aside from the operating unit being operated is detected.

Variation 3

The condition for making an outgoing call using the automatic outgoing call function is not limited to an operation performed by the user being detected.

For example, control unit 11 of communication terminal device 10 may make an outgoing call in the case where communication terminal device 10 is in an at-rest state continuously for a predetermined period from when the user's head area is detected as being near by proximity sensor 18 or from when the partner is specified. The at-rest state is a state in which a change in the orientation or the displacement of communication terminal device 10 is not detected at all or is detected very little. Additionally, control unit 11 may make an outgoing call immediately upon a voice call partner being specified.

Variation 4

Communication terminal device 10 may make an outgoing call in the case where an operation made by the user for instructing the outgoing call has been received through an operating unit after a voice call partner has been specified. For example, upon a voice call partner being specified, control unit 11 of communication terminal device 10 displays information of that partner using display unit 121. In the case where the user views this information display and a desired partner is specified, the user performs an operation instructing an outgoing call to be made by using touch screen unit 12, for example. In this case as well, it is not necessary for the user to perform an operation for specifying the voice call partner, which lightens the operational burden on the user as compared to a case where such an operation is necessary.

Additionally, control unit 11 may specify two or more voice call partners and cause information of those partners to be displayed using display unit 121. In this case, the user performs an operation for specifying a call destination partner from among the two or more voice call partners that have been specified. In this case as well, the operational burden on the user is lightened as compared to a case where the user performs an operation for specifying the voice call partner using an address book, for example.

Variation 5

Control unit 11 of communication terminal device 10 may carry out notification processing by using a ringback tone as audio based on the voice call partner. To that end, a switching system that generates the ringback tone defines the ringback tone to be used in accordance with a combination of communication terminal device 10 that is the origin of the outgoing call and the partner. By specifying the combination of communication terminal device 10 that is the origin of the outgoing call and the partner, the switching system generates a ringback tone corresponding to that combination. Control unit 11 of communication terminal device 10 outputs the ringback tone generated by the switching system as audio via speaker 15. Through this, the period in which the user waits for the partner's response can be used to understand who the partner is.

Variation 6

Communication terminal device 10 may also be varied as described hereinafter. Although the following describes a representative example in which the present variation is applied in communication terminal device 10 according to the above-describe first embodiment, the present variation may be applied in communication terminal device 10 according to the second embodiment to the sixth embodiment.

Figure 19:
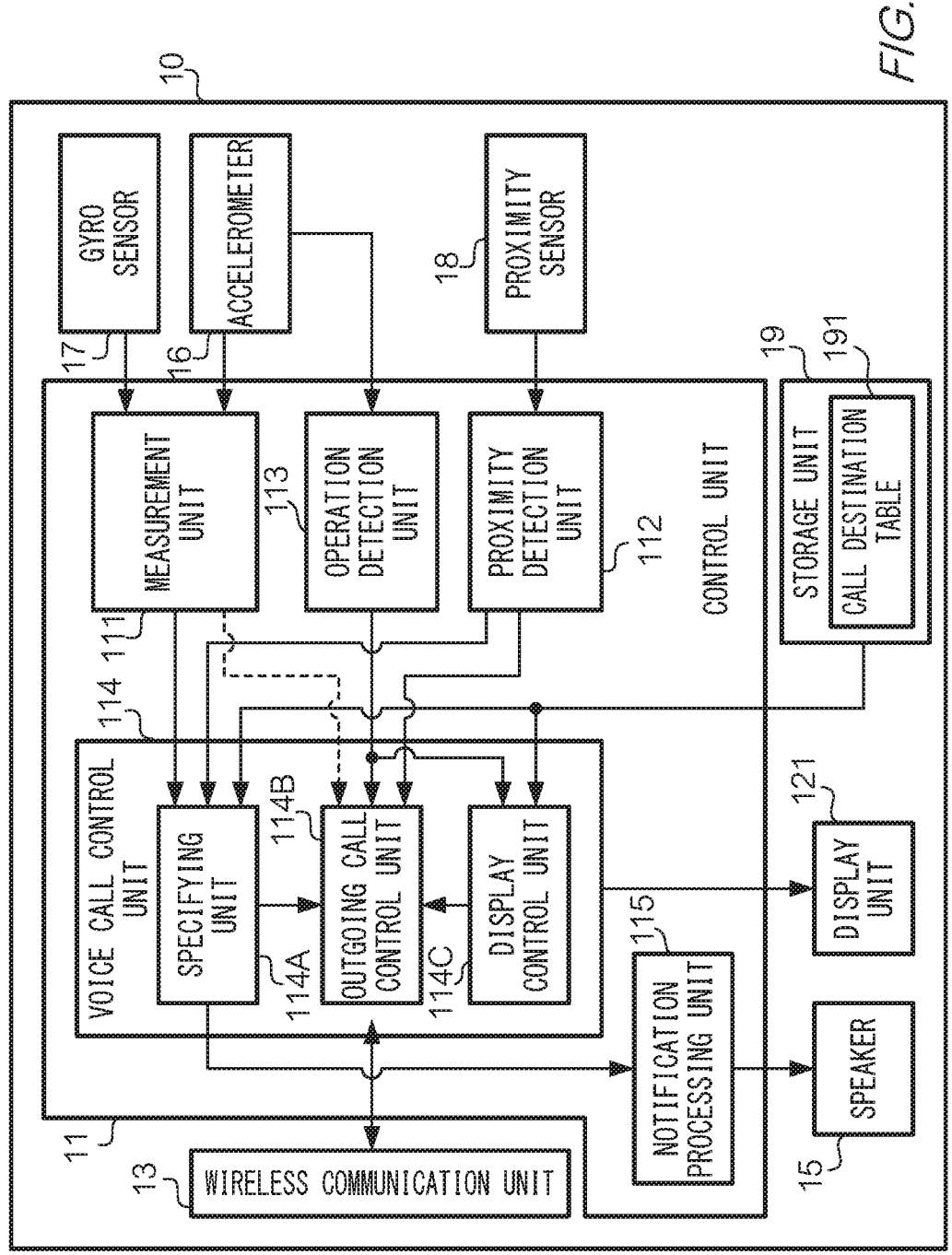
FIG. 19 is a block diagram illustrating the functional configuration of a control unit according to Variation 6 of the present invention.

FIG. 19 is a block diagram illustrating the functional configuration of control unit 11 in communication terminal device 10 according to the present variation. As illustrated in FIG. 19, in addition to the functions described above in the first embodiment, control unit 11 implements a function corresponding to display control unit 114C in voice call control unit 114. In the case where it is detected that a predetermined operation has been carried out by the user using communication terminal device 10, display control unit 114C causes a partner screen indicating a voice call partner to which an outgoing call is made using the automatic outgoing call function to be displayed in display unit 121. The partner screen is a screen indicating a partner for an outgoing call made by the automatic outgoing call function. The partner screen is displayed on the basis of information in call destination table 191, for example. Although the predetermined operation is assumed to be an operation of shaking communication terminal device 10 here, another operation, such as described in Variation 2, may be used instead. Additionally, it is assumed in the present variation that this operation is detected by operation detection unit 113.

Furthermore, in the case where the user's head area is detected as being near by proximity detection unit 112 during a display period of the partner screen, outgoing call control unit 114B calls the call destination specified on the basis of the orientation or displacement measured by measurement unit 111 during that display period. To rephrase, outgoing call control unit 114B does not permit this outgoing call to be made outside of the screen display period of the partner screen. In the present variation, the period in which an outgoing call is permitted to be made by the automatic outgoing call function is limited to the screen display period of the partner screen.

Figure 20A:
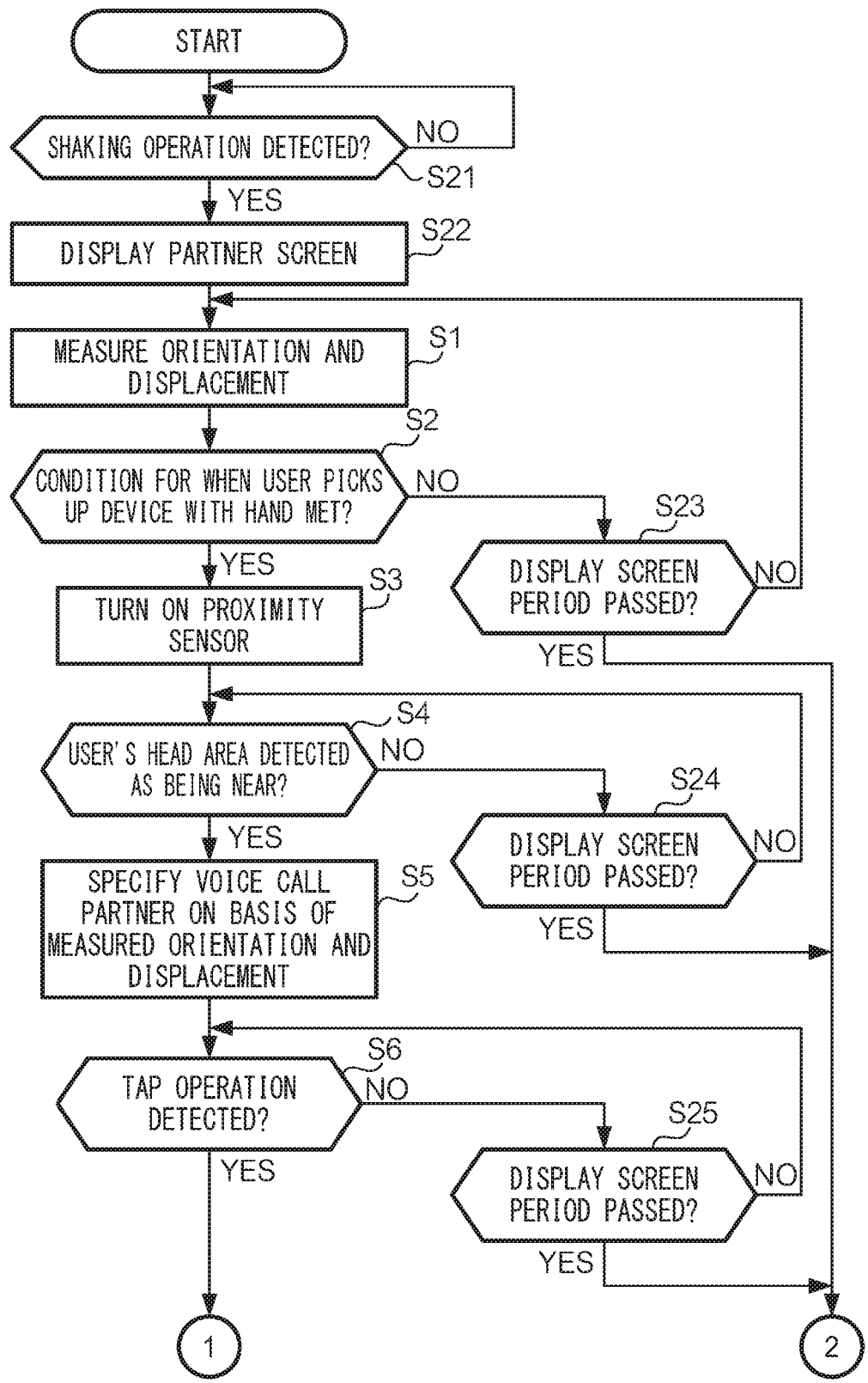
FIG. 20A is a flowchart illustrating processing pertaining to an automatic outgoing call function executed by a communication terminal device according to the same variation.
Figure 20B:
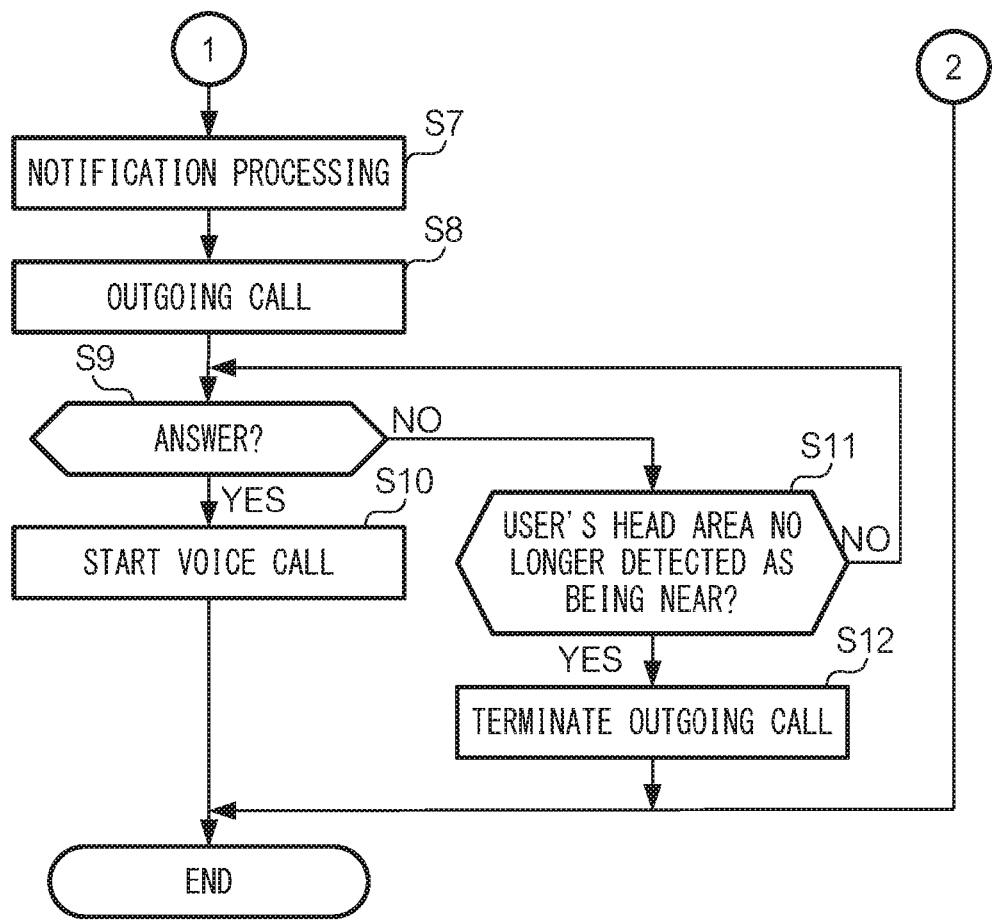
FIG. 20B is a flowchart illustrating processing continuing from FIG. 20A.

FIGS. 20A and 20B are flowcharts illustrating processing pertaining to the automatic outgoing call function executed by communication terminal device 10 according to the present variation.

First, control unit 11 determines whether or not an operation of shaking communication terminal device 10 has been detected using accelerometer 16 (step S21 in FIG. 20A). In the case of a determination of "YES" in step S21, control unit 11 causes the partner screen to be displayed in display unit 121 (step S22).

Figure 21:
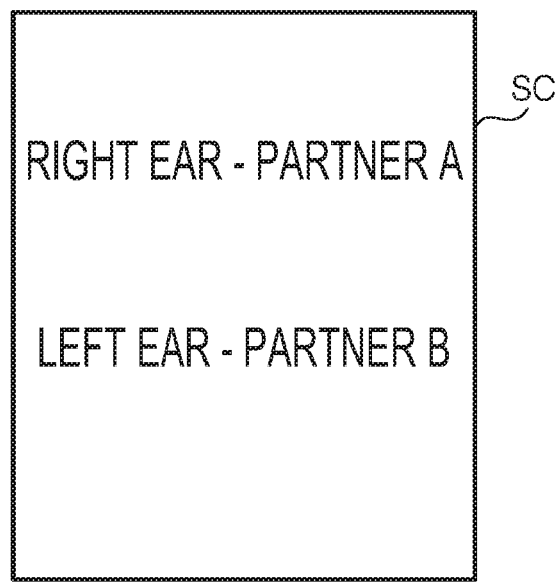
FIG. 21 is a diagram illustrating an example of a partner specifying screen according to the same variation.

FIG. 21 is a diagram illustrating an example of the partner screen. In partner screen SC illustrated in FIG. 21, voice call partners are displayed in association with operations required for calling those partners using the automatic outgoing call function. Here, a message reading "right ear—partner A" and "left ear—partner B" is displayed in partner screen SC. Having viewed partner screen SC, the user can know the operation required to call the partner s/he desires.

Upon the partner screen being displayed in step S22, control unit 11 advances the processing to step S1. Control unit 11 causes the partner screen to be displayed during the screen display period (five seconds, for example) comma and causes the display of the partner screen to be terminated outside the screen display period. Specifically, in the case where a determination of "NO" is made in step S2, the case where a determination of "NO" is made in step S4, and the case where a determination of "NO" is made in step S6, control unit 11 determines whether or not the screen display period for the partner screen has passed (step S23, S24, S25). Control unit 11 returns the processing to step S1 in the case where a determination of "NO" is made in step S23, to step S4 in the case where a determination of "NO" is made in step S24, and to step S6 in the case where a determination of "NO" is made in step S24. The length of the screen display period is a fixed value, for example. In the case of a determination of "YES" in step S23, S24, or S25, control unit 11 ends the processing of FIG. 20.

The remaining processing pertaining to the automatic outgoing call function is the same as in the above-described first embodiment. In other words, in the case where in the display period of the partner screen, it is determined whether or not that measured orientation and displacement me a condition occurring when the user holds communication terminal device 10 in his/her hand (in other words, "YES" in step S2), and it is determined that the user's head area is detected as being near by proximity sensor 18 (in other words, "YES" in step S4), control unit 11 permits an outgoing call to be made by the automatic outgoing call function (in other words, permits the execution of the processing of step S8). Additionally, as described above, the partner screen is displayed in the case where the user has performed a predetermined operation using communication terminal device 10. As such, according to communication terminal device 10 of the present variation, the likelihood of an outgoing call being erroneously made at a timing not intended by the user can be reduced.

In the present variation, control unit 11 may make the outgoing call in step S8 without performing the determination of step S6. Even in such a case, the partner screen serving as the condition for making an outgoing call using the automatic outgoing call function is displayed in the case where the user performs the predetermined operation using communication terminal device 10, and thus the likelihood that an outgoing call will be erroneously made at a timing not intended by the user can be reduced.

Furthermore, control unit 11 may make the length of the screen display period variable. For example, control unit 11 may use a length specified by a setting made by the user as the screen display period. Alternatively, control unit 11 may use a length based on a surrounding environment of communication terminal device 10 (or the user thereof) as the screen display period. For example, in the case where a measurement result from an illuminance sensor indicates that communication terminal device 10 is located in a relatively dark environment (for example, an illuminance is less than a threshold), control unit 11 sets the screen display period to be longer than in the case where communication terminal device is located in a brighter environment (for example, the illuminance is greater than or equal to the threshold). This is because it is thought that in the case where the user is in a dark environment, it is more difficult to see the partner screen and thus more difficult to perform the operation required to make the outgoing call using the automatic outgoing call function that in the case where the user is in a bright environment. Additionally, on the basis of a setting for a size of text displayed in the screen, control unit 11 may make the screen display period longer in the case where the size is relatively large (for example, a size greater than or equal to a threshold) than in the case where the size is smaller (for example, a size lower than the threshold). This is because it is thought that in the case where the text size is relatively large, the user is a comparatively older user and thus requires more time to perform the operation required to make outgoing call using the automatic outgoing call function, whereas in the case where the text size is relatively small, the user is a comparatively younger user and thus does not require as much time to perform the operation required to make the outgoing call using the automatic outgoing call function. Note that control unit 11 may vary the length of the screen display period in accordance with other conditions as well.

Variation 7

Configurations and operations described in the above embodiments may be partially omitted.

Communication terminal device 10 may implement the automatic outgoing call function on the basis of the orientation or displacement of communication terminal device 10 itself. In this case, measurement unit 111 measures the orientation or the displacement of communication terminal device 10. In other words, communication terminal device 10 may implement the automatic outgoing call function on the basis of at least one of the orientation and the displacement of communication terminal device 10 itself.

Communication terminal device 10 need not carry out the notification processing when an outgoing call is made using the automatic outgoing call function.

Communication terminal device 10 may cause proximity sensor 18 to operate continuously while communication terminal device 10 is turned on. Furthermore, the sensors provided in communication terminal device 10 are merely examples.

Variation 8

Communication terminal device 10 is not limited to a smartphone, and may be another mobile communication terminal device that carries out communication for voice calls, such as a featurephone. In such a communication terminal device, a part held in the user's hand and used is a transmitter/receiver for sending and receiving voice.

Variation 9

The communication terminal device according to the present invention can also be applied in a communication terminal device that produces bone conduction sound expressing audio including received voice in the user's body, or in other words, in a communication terminal device including a speaker that outputs bone conduction sound. This communication terminal device is configured such that the user can make a voice call even when the device is in contact with a part of the user's head area aside from the ear.

Additionally, the communication terminal device according to the present invention need not be a communication terminal device used while the user holds the device in his/her hand during a voice call. The communication terminal device according to the present invention may be what is known as a wearable terminal, such as a headphone type or an earphone type that is used while being worn on the user's head area.

Variation 10

The communication terminal device according to the present invention is not limited to a mobile communication terminal device, and may be a communication terminal device including a receiver, such as a fixed-type (installed-type) communication terminal. This communication terminal device includes, for example, a main telephone unit for carrying out communication for voice calls, and a receiver used while being held in the user's hand for the purpose of a voice call. A telephone in which the main telephone unit and the receiver are connected by a cord (wired) and a cordless telephone in which the main telephone unit and the receiver are connected wirelessly are examples of such a communication terminal device.

The configuration and operations of the communication terminal device according to this variation can be described by reading the descriptions of the above-described embodiments as follows: the orientation and displacement of communication terminal device 10 are read as an orientation and displacement of the receiver; communication terminal device 10 being near the user's head area is read as the receiver being near the user's head area; and an operation performed by the user using communication terminal device 10 is read as an operation performed by the user using the receiver.

Variation 11

The functions implemented by control unit 11 of communication terminal device 10 in the above-described embodiments can be implemented by a combination of a plurality of programs, or by a plurality of hardware resources working cooperatively. In the case where the functions of control unit 11 are realized using programs, the programs may be provided stored in a computer-readable recording medium such as a magnetic recording medium (magnetic tape, a magnetic disk (a Hard Disk Drive (HDD), a Flexible Disk (FD), or the like), an optical recording medium (an optical disk or the like), a magneto-optical recording medium, or a semiconductor memory; or may be distributed over a network. The present invention can also be understood as an outgoing call control method.

DESCRIPTION OF REFERENCE NUMERALS

10 . . . communication terminal device
11 . . . control unit
111 . . . measurement unit
112 . . . proximity detection unit
113 . . . operation detection unit
114 . . . voice call control unit
114A . . . specifying unit
114B . . . outgoing call control unit
114C . . . display control unit
115 . . . notification processing unit
12 . . . touch screen unit
121 . . . display unit
121A . . . display region
122 . . . touch sensor
13 . . . wireless communication unit
14 . . . microphone
15 . . . speaker
16 . . . accelerometer
17 . . . gyrosensor
18 . . . proximity sensor
19 . . . storage unit
191, 191A, 191B . . . call destination table
192 . . . schedule data

What is claimed is:

1. A mobile communication terminal device comprising:
a specifying unit that specifies a voice call partner;
an outgoing call control unit that calls the specified voice call partner;
a measurement unit that measures an orientation or a displacement of the communication terminal device; and
a proximity detection unit that detects when a head area of a user is near the communication terminal device; and
a memory that stores a plurality of patterns of change over time of the orientation of the communication terminal device and associates each pattern of change over time with a respective voice call partner, wherein each pattern of change over time defines at least the orientation of the communication terminal device when the communication terminal device is near the head area of the user,
wherein in the case where the head area is detected as being near, the specifying unit specifies the voice call partner on the basis of the orientation or displacement measured before the head area was detected as being near, or the specifying unit specifies the voice call partner on the basis of one of the plurality of patterns of change over time while the head area was detected as being near; and
wherein the specifying unit specifies the voice call partner by an operation of at least one tap on the rear surface side of the communication terminal device.

2. The communication terminal device according to claim 1,
wherein the specifying unit specifies the partner on the basis of the orientation measured at a single point in time while the head area is detected as being near.

3. The communication terminal device according to claim 1, further comprising:

an operation detection unit that detects a predetermined operation being made by the user using the communication terminal device, wherein the outgoing call control unit makes an outgoing call to the specified partner in the case where the operation is detected.

4. The communication terminal device according to claim 3, wherein the specifying unit specifies the partner on the basis of the measured orientation or displacement and the operation detected while the head area is detected as being near.

5. The communication terminal device according to claim 1, further comprising:

an operation detection unit that detects a predetermined operation being made by the user using the communication terminal device; and a display control unit that, in the case where a predetermined operation made using the communication terminal device is detected, causes a partner screen indicating the partner to be specified by the specifying unit to be displayed in a display unit, wherein in the case where the head area is detected as being near during a display period of the partner screen, the outgoing call control unit makes an outgoing call to a call destination specified on the basis of an orientation or displacement measured during the display period.

6. The communication terminal device according to claim 1, further comprising:

a notification processing unit that makes a notification of the specified partner by outputting audio.

7. The communication terminal device according to claim 1, wherein in the case where the orientation or displacement meeting a predetermined condition are measured after an outgoing call to the specified partner has been initiated, the outgoing call control unit terminates the outgoing call.

8. The communication terminal device according to claim 1, wherein the outgoing call control unit does not permit an outgoing call to be made to the partner in a period when the communication terminal device is outputting audio, the audio including a voice signal.

9. The communication terminal device according to claim 1, wherein the specifying unit varies the partner specified in the case where a predetermined orientation or displacement has been measured, in accordance with a point in time when the measurement was made, a location where the measurement was made, or schedule data of the user.

10. A communication terminal device equipping a receiver, the device comprising:

a specifying unit that specifies a voice call partner;

an outgoing call control unit that calls the specified voice call partner;

a measurement unit that measures an orientation or a displacement of the receiver; and a proximity detection unit that detects proximity of a head area of a user to the receiver; and a memory that stores a plurality of patterns of change over time of the orientation of the communication terminal device and associates each pattern of change over time with a respective voice call partner, wherein each pattern of change over time defines at least the orientation of the communication terminal device when the communication terminal device is near the head area of the user, wherein in the case where the head area is detected as being near, the specifying unit specifies the voice call partner on the basis of the orientation or displacement measured before the head area was detected as being near, or the specifying unit specifies the voice call partner on the basis of one of the plurality of patterns of change over time while the head area was detected as being near; and wherein the specifying unit specifies the voice call partner by an operation of at least one tap on the rear surface side of the communication terminal device.

11. An outgoing call control method for a mobile communication terminal device, the method comprising:

a step of specifying a voice call partner;

a step of measuring an orientation or a displacement of the communication terminal device, wherein the communication terminal device includes a memory that stores a plurality of patterns of change over time of the orientation of the communication terminal device and associates each pattern of change over time with a respective voice call partner, wherein each pattern of change over time defines at least the orientation of the communication terminal device when the communication terminal device is near the head area of the user; and a step of detecting when a head area of a user is near the communication terminal device, wherein in the case where the head area is detected as being near, in the step of specifying, the voice call partner is specified on the basis of the orientation or displacement measured before the head area was detected as being near, or the voice call partner is specified on the basis of one of the plurality of patterns of change over time while the head area was detected as being near; and wherein the voice call partner is specified by an operation of at least one tap on the rear surface side of the communication terminal device.

12. A program stored in a non-transitory computer readable medium, the program including instructions for causing a computer of a mobile communication terminal device to execute:

a step of specifying a voice call partner;

a step of measuring an orientation or a displacement of the communication terminal device, wherein the communication terminal device includes a memory that stores a plurality of patterns of change over time of the orientation of the communication terminal device and associates each pattern of change over time with a respective voice call partner, wherein each pattern of change over time defines at least the orientation of the communication terminal device when the communication terminal device is near the head area of the user; and a step of detecting when a head area of a user is near the communication terminal device, wherein in the case where the hear area is detected as being near, in the step of specifying, the voice call partner is specified on the basis of the orientation or displacement measured before the head area was detected as being near, or the voice call partner is specified on the basis of one of the plurality of patterns of change over time while the head area was detected as being near; and wherein the voice call partner is specified by an operation of at least one tap on the rear surface side of the communication terminal device.

\* \* \* \* \*